(12) United States Patent
Lee et al.

(10) Patent No.: US 11,428,856 B2
(45) Date of Patent: Aug. 30, 2022

(54) METHOD OF MANUFACTURING SCREEN PROTECTOR HAVING GRATING SHEET

(71) Applicant: WINTAN INTERNATIONAL CORP., Fremont, CA (US)

(72) Inventors: An-Fang Lee, Fremont, CA (US); Ming Kuei Chen, Fremont, CA (US)

(73) Assignee: WINTAN INTERNATIONAL CORP., Fremont, CA (US)

( * ) Notice: Subject to any disclaimer, the term of this patent is extended or adjusted under 35 U.S.C. 154(b) by 597 days.

(21) Appl. No.: 16/438,450

(22) Filed: Jun. 11, 2019

(65) Prior Publication Data

US 2020/0241181 A1 Jul. 30, 2020

(30) Foreign Application Priority Data

Jan. 29, 2019 (TW) ................................ 108103376

(51) Int. Cl.
| | | |
|---|---|---|
| *G02B 1/11* | (2015.01) | |
| *G02B 1/14* | (2015.01) | |
| *G02B 1/18* | (2015.01) | |
| *G02B 5/00* | (2006.01) | |
| *G02B 5/18* | (2006.01) | |
| *G06F 1/16* | (2006.01) | |
| *H04B 1/3888* | (2015.01) | |
| *G02B 5/30* | (2006.01) | |

(52) U.S. Cl.
CPC .............. *G02B 5/1861* (2013.01); *G02B 1/11* (2013.01); *G02B 1/14* (2015.01); *G02B 1/18* (2015.01); *G02B 5/003* (2013.01); *G02B 5/1866* (2013.01); *G06F 1/1616* (2013.01); *G06F 1/1626* (2013.01); *G06F 1/1637* (2013.01); *G06F 1/1686* (2013.01); *H04B 1/3888* (2013.01); *G02B 5/3066* (2013.01)

(58) Field of Classification Search
CPC ...... G02B 1/11–118; G02B 1/14; G02B 1/18; G02B 5/003; G02B 5/1861; G02B 5/1866; G02B 5/20; G02B 5/201; G02B 5/3066; G02B 2207/123; G02F 1/133524; G06F 1/1616; G06F 1/1626; G06F 1/1637; G06F 1/1686; H04B 1/3888
See application file for complete search history.

(56) References Cited

U.S. PATENT DOCUMENTS

| | | | | |
|---|---|---|---|---|
| 7,529,364 | B2 * | 5/2009 | Buehler | H04B 1/3888 |
| | | | | 455/575.8 |
| 10,796,028 | B2 * | 10/2020 | Li | G02B 7/006 |
| 10,909,274 | B2 * | 2/2021 | Li | G06F 21/84 |

\* cited by examiner

*Primary Examiner* — Ryan S Dunning

(57) ABSTRACT

A screen protector configured to be disposed on an attaching body on an electronic device in an attaching mode to correspondingly cover a display screen of the electronic device. The screen protector comprises a grating sheet and a first attaching member disposed vertically adjacent to each other side-by-side and coated between two outer cover films. The screen protector is disposed on the attaching body on the electronic device in an attaching mode through the attaching member, so that a viewing zone defined by the grating sheet correspondingly covers the display screen of the electronic device.

9 Claims, 41 Drawing Sheets

METHOD OF MANUFACTURING SCREEN PROTECTOR HAVING GRATING SHEET

CROSS-REFERENCE TO RELATED APPLICATIONS

The present application claims priority to Taiwanese Patent Application No. 108103376 filed on Jan. 29, 2019, the entire contents of which are hereby incorporated by reference.

BACKGROUND OF THE INVENTION

1. Field of the Invention

The present invention relates to a protector, and in particular, to an adsorption screen protector.

2. Description of the Related Art

With the advancement of technology and the development of the Internet, mobile devices (such as smart phones, tablet computers, laptops, etc.) have become an indispensable item in people's lives. Since the mobile devices are very convenient to carry, they can be used in public occasions such as offices, public places or public transportation.

In general, the screens of the mobile devices currently available in the market do not have a peep-prevention function. Therefore, when the mobile device is used in public, the people around can easily peek at the display content on the screen, and the privacy of the user cannot be protected. Based on the foregoing problems, most of the current coping practices are to additionally attach a peep-prevention sheet to the screen of the mobile device to avoid easy peeping by others. However, the peep-prevention sheet is secured in a pasting mode, and the user needs to tear it off when it is not needed, and it is easy to leave residual glue after the tearing, which causes trouble and re-installation inconvenience. Even if the mobile device is used in a personal space, and there is no need to consider privacy protection temporarily, it is still not easy to remove the secured peep-protection sheet.

If the peep-protection sheet is still secured on the screen in a safe environment, the brightness of the screen will be darkened and the sharpness of the picture will be reduced, and the original clear and high-contrast visual perception of the screen is reduced in long-term use, and thus, it is still needed to improve the peep-protection sheet.

To solve the foregoing problems, a product which is composed of a magnetic functional component and the peep-protection sheet has been developed in recent years. As shown in FIG. 15A, such peep-protection sheet is to add a functional component B on the side of either surface of a protection sheet body A, and dispose the attaching bodies 3 at corresponding positions around the screen of the electronic device 2, so that the user can secure the peep-protection sheet to the surface of the screen or take it down according to actual needs during use.

However, due to the trend of thinning of the hardware design of the electronic device, when the screen (located on the upper cover) of the electronic device such as a notebook computer is closed, the space formed by the inner surface of the screen and the inner surface of the keyboard is very limited. If a decorative or functional protruding structure is disposed on the outer surface of the peep-protection sheet, the upper cover of the notebook computer cannot be smoothly closed, and the sleep program executed by relevant components of the notebook computer which are originally triggered by closing the upper cover would be hindered. Furthermore, since the peep-protection sheet is effective in preventing peep by changing the visible light transmittance of different viewing angles, when the peep-protection sheet is secured to the screen surface, the functional component B protruding from the protection sheet body A may cause the protection sheet body A to incline toward the other side where no functional component is installed, and thus the protection sheet body A cannot be disposed in parallel to the screen surface, as shown in FIG. 17B, and the user's visibility when viewing the screen would be affected.

Because the key materials, key technologies and mass production technologies for producing the viewing angle limitation effect of the peep-protection sheet have been mastered by a few material companies in the past 20 years, the development of the attachment technology of the peep-protection sheet to the screen of the electronic device is only limited to attaching a protruding structure at the outer surface of the peep-protective sheet. Therefore, it is imperative that all walks of life can develop a novel screen protector that can achieve the effect of easy and quick disassembly and assembly, and can also achieve the overall thinning effect of the screen protector.

SUMMARY OF THE INVENTION

In view of the foregoing problems, the inventors have diligently studied and searched for various possible solutions for solving the foregoing problems of the conventional technology, and have developed a novel technology of integrating sheet a functional component (for example, a ferromagnetic attaching element) and/or a decorative component (such as a pigment/paint layer or a pattern film) and the grating sheet inside the peep-prevention sheet in the same layer, so as to achieve the overall thinning effect of the screen protector, thereby solving the technical problem of how to not inclined or bend the functional components and two flat components of different materials of the grating sheet at the junction when they are integrated into the same layer. Furthermore, the upper cover can be smoothly closed when the screen protector is used to adsorb the screen of the notebook computer, so that the notebook computer can smoothly trigger the sleep program. Moreover, the solution of the present invention that the screen protector can achieve the effect of easy and quick disassembly and assembly, without adding an external protruding structure can achieve the effect of providing the functional components and the decorative components on the screen protector.

In other words, the present invention provides a manufacturing method of a screen protector, wherein the screen protector is a laminated structure having a flat outer surface without an interval and at least comprising a first outer cover film, a functional layer composed of a grating sheet and an attaching member, and a second outer cover film and is configured to be disposed on an attaching body on an electronic device in an attaching mode to correspondingly cover a display screen of the electronic device, and the manufacturing method comprises the following steps: a sheet punching step: sheets constituting the first outer cover film, the second outer cover film, the grating sheet, and the attaching member are cut into specific sizes, respectively; a functional layer forming step: the grating sheet and the attaching member are disposed and attached to a front surface of the second outer cover film to form the functional layer, and the attaching member is disposed adjacent to the grating sheet side-by-side; a half-finished product forming step: a rear surface of the first outer cover film is bonded to the grating sheet and the attaching member to form a half-finished product; and a heating and pressing defoaming step: vacuum-pressing is performed on the half-finished product under appropriate conditions, to remove bubbles inside the half-finished product, and the surface of the half-finished product is flattened to obtain the screen protector.

In an embodiment of the present invention, prior to the functional layer forming step, the method further comprises an adhesive layer applying step: a viscous adhesive material is respectively applied to the rear surface of the first outer cover film and the front surface of the second outer cover film respectively, to form a first adhesive layer and a second adhesive layer.

In an embodiment of the present invention, in the functional layer forming step, the grating sheet and the attaching member are attached to the front surface of the second outer cover film through the second adhesive layer; and in the half-finished product forming step, the grating sheet and the attaching member are attached to the rear surface of the first outer cover film through the first adhesive layer.

In an embodiment of the present invention, the grating sheet has a visual range within a specific angle. The grating sheet comprises an outer layer and a grating layer, and the grating layer comprises a plurality of grating walls.

In an embodiment of the present invention, there is one or a plurality of attaching members.

In addition, the present invention may further provide a screen protector, wherein the screen protector is a laminated structure having a flat outer surface without an interval and at least comprising a first outer cover film, a functional layer composed of a grating sheet and a first attaching member, and a second outer cover film and is configured to be disposed on an attaching body on an electronic device in an attaching mode to correspondingly cover a display screen of the electronic device, wherein the grating sheet is configured to define a viewing zone to limit penetrable light to an allowable viewing angle range; the first attaching member is configured to define an adsorption zone and is disposed vertically adjacent to the grating sheet side-by-side, and the attaching member is located above the grating sheet; and the grating sheet and the first attaching member are coated with the first outer cover film and the second outer cover film, so that the grating sheet and the first attaching member are located between the first outer cover film and the second outer cover film. The first attaching member, the first outer cover film and the second outer cover film each have an opening corresponding to each other, and the opening is configured to correspond to a functional component on the electronic device and avoid covering the functional component, wherein the openings of the first attaching member, the first outer cover film, and the second outer cover film are through holes defined by a closed inner edge, or notches that are open on one side and defined by the inner edges of three sides. The first attaching member is separated by a gap into two half-attaching members that are disposed in left and right sides and aligned with each other, and the first outer cover film and the second outer cover film each have an opening corresponding to the gap; the gap and the opening are configured to correspond to a functional component on the electronic device and avoid covering the functional component, wherein the openings of the first outer cover film and the second outer cover film are notches that are open on one side and defined by the inner edges of three sides. The screen protector further comprises a second attaching member, the second attaching member and the first attaching member are respectively disposed opposite at the side of the grating sheet, and are disposed vertically adjacent to the grating sheet side-by-side, and the second attaching member is located below the grating sheet, so that the first attaching member, the grating sheet and the second attaching member are sequentially arranged from top to bottom, and are disposed together between the first outer cover film and the second outer cover film. The first attaching member is ring-shaped and has a main opening for embedding the grating sheet, so that an outer periphery of the grating sheet is adjacent to an inner periphery of the main opening. The screen protector further comprises a third attaching member, and a corner of a bottom edge of the grating sheet has a retracted truncated side, and the third attaching member has an inner side aligned with and adjacent to the truncated side of the grating sheet, so that the third attaching member is disposed at the corner of the bottom edge of the grating sheet. The screen protector further comprises a third attaching member disposed at a corner of a bottom edge of the grating sheet, and the third attaching member is rectangular, right-triangular or L-shaped. The screen protector further comprises a decorative layer disposed on a front surface and/or a rear surface of the first attaching member, or on front surfaces and/or rear surfaces of the first outer cover film and the second outer cover film, and corresponding to the first attaching member. The first attaching member extends along a long side and/or a short side of the grating sheet. The screen protector further comprises a transparent first adhesive layer and a second adhesive layer configured to attach the grating sheet and the first attaching member between the first outer cover film and the second outer cover film, respectively. The screen protector, wherein the grating sheet comprises an outer layer and a grating layer, and the grating layer comprises a plurality of grating walls. The screen protector further comprises a tab, wherein the tab comprises two lugs which extend from the first outer cover film and the second outer cover film, respectively. The attaching body is correspondingly adsorbed with the attaching member, and is affixed to the electronic device by default, or is freely attached to the outer surface of the electronic device.

Moreover, the present invention can also provide a screen protector, wherein the screen protector is a laminated structure having a flat outer surface without an interval and at least comprising a first outer cover film, a functional layer composed of a grating sheet, a first attaching member and two third attaching members, and a second outer cover film and is configured to be disposed on an attaching body on an electronic device in an attaching mode to correspondingly cover a display screen of the electronic device, wherein the grating sheet is configured to define a viewing zone to limit penetrable light to an allowable viewing angle range; the first attaching member is configured to define an adsorption zone and is disposed vertically adjacent to the grating sheet side-by-side, and the attaching member is located above the grating sheet; the two third attaching members are disposed at two corners of the bottom edges of the grating sheet; and the grating sheet, the first attaching member and the two third attaching members are coated with the first outer cover film and the second outer cover film, so that the grating sheet, the first attaching member and the two third attaching members are located between the first outer cover film and the second outer cover film. The first attaching member, the first outer cover film and the second outer cover film each have an opening corresponding to each other, and the opening is configured to correspond to a functional component on the electronic device and avoid covering the functional component, wherein the openings of the first attaching member, the first outer cover film, and the second outer cover film are through holes defined by a closed inner edge, or notches that are open on one side and defined by the inner edges of three sides. The first attaching member is separated by a gap into two half-attaching members that are disposed in left and right sides and aligned with each other, and the first outer cover film and the second outer cover film each have an opening corresponding to the gap; the gap and the opening are configured to correspond to a functional component on the electronic device and avoid covering the functional component, wherein the openings of the first outer cover film and the second outer cover film are notches that are open on one side and defined by the inner edges of three sides. A corner of a bottom edge of the grating sheet has a retracted truncated side, and the third attaching member has an inner side aligned with and adjacent to the truncated side of the grating sheet, so that the third attaching member is disposed at the corner of the bottom edge of the grating sheet. The screen protector further comprises a third attaching member, and a corner of a bottom edge of the grating sheet has a pair of retracted truncated sides, and the third attaching member has a pair of inner sides aligned with and adjacent to the pair of truncated sides of the grating sheet, so that the third attaching member is disposed at the corner of the bottom edge of the grating sheet. The third attaching member is rectangular, right-triangular or L-shaped. The screen protector further comprises a decorative layer disposed on a front surface and/or a rear surface of the first attaching member and/or the third attaching member, or on front surfaces and/or rear surfaces of the first outer cover film and the second outer cover film, and corresponding to the first attaching member and/or the third attaching member. The first attaching member extends along a long side and a short side of the grating sheet. The attaching body is correspondingly adsorbed with the attaching member, and is affixed to the electronic device by default, or is freely attached to the outer surface of the electronic device.

Furthermore, the present invention also provides a screen protector, wherein the screen protector is a laminated structure having a flat outer surface without an interval and at least comprising a first outer cover film, a functional layer composed of a grating sheet and a first attaching member, and a second outer cover film and is configured to be disposed on an attaching body on an electronic device in an attaching mode to correspondingly cover a display screen of the electronic device, wherein the grating sheet is configured to define a viewing zone to limit penetrable light to an allowable viewing angle range; the first attaching member is configured to define an adsorption zone and is disposed vertically adjacent to the grating sheet side-by-side, and the attaching member is located above the grating sheet; and the grating sheet and the first attaching member are coated with two transparent outer cover film so that the grating sheet and the first attaching member are located between the first outer cover film and the second outer cover film, wherein the first attaching member is separated by a gap into two half-attaching members that are disposed in left and right sides and aligned with each other, and the first outer cover film and the second outer cover film each have an opening corresponding to the gap; the gap and the openings are configured to correspond to a functional component on the electronic device and avoid covering the functional component, wherein the openings of the first outer cover film and the second outer cover film are notches that are open on one side and defined by the inner edges of three sides, wherein the screen protector is adsorbed to the attaching body on the electronic device through the attaching member, so that the grating sheet correspondingly covers the display screen of the electronic device. The screen protector further comprises a second attaching member, the second attaching member and the first attaching member are respectively disposed opposite at the side of the grating sheet, and are disposed vertically adjacent to the grating sheet side-by-side, and the second attaching member is located below the grating sheet, so that the first attaching member, the grating sheet and the second attaching member are sequentially arranged from top to bottom, and are disposed together between the first outer cover film and the second outer cover film. The two half-attaching members of the first attaching member are annularly connected along the outer periphery of the grating sheet to form a ring shape, and a main opening is formed for embedding the grating sheet, so that the outer periphery of the grating sheet is adjacent to an inner periphery of the main opening. The gap is disposed along a long side and/or a short side of the grating sheet. The screen protector further comprises a third attaching member disposed at a corner of a bottom edge of the grating sheet, and the third attaching member is rectangular, right-triangular or L-shaped. The screen protector further comprises a decorative layer disposed on front surfaces and/or rear surfaces of the two half-attaching members, or on front surfaces and/or rear surfaces of the first outer cover film and the second outer cover film, and corresponding to the two half-attaching members. The two half-attaching members extend along a long side and/or a short side of the grating sheet. The attaching body is correspondingly adsorbed with the attaching member, and is affixed to the electronic device by default, or is freely attached to the outer surface of the electronic device.

Thereby, the screen protector of the present invention reverses the design direction of the externally added components that have not been solved for decades, and the attaching member is disposed adjacent to the grating sheet side-by-side, and is coated with, at the front and back, the two outer cover films. The functional components and decorative components are successfully integrated into the same layer as the grating sheet, and the screen protector is further thinned while maintaining its original fast adsorption removal function and decorative requirements. Moreover, the screen protector of the present invention can provide sufficient structural strength through two outer cover films and the attachment of the first adhesive layer and the second adhesive layer, so that two independent planar components, i.e., the grating sheet and the attaching member are not inclined or bent at the junction.

DETAILED DESCRIPTION OF THE PREFERRED EMBODIMENTS

Figure 1:
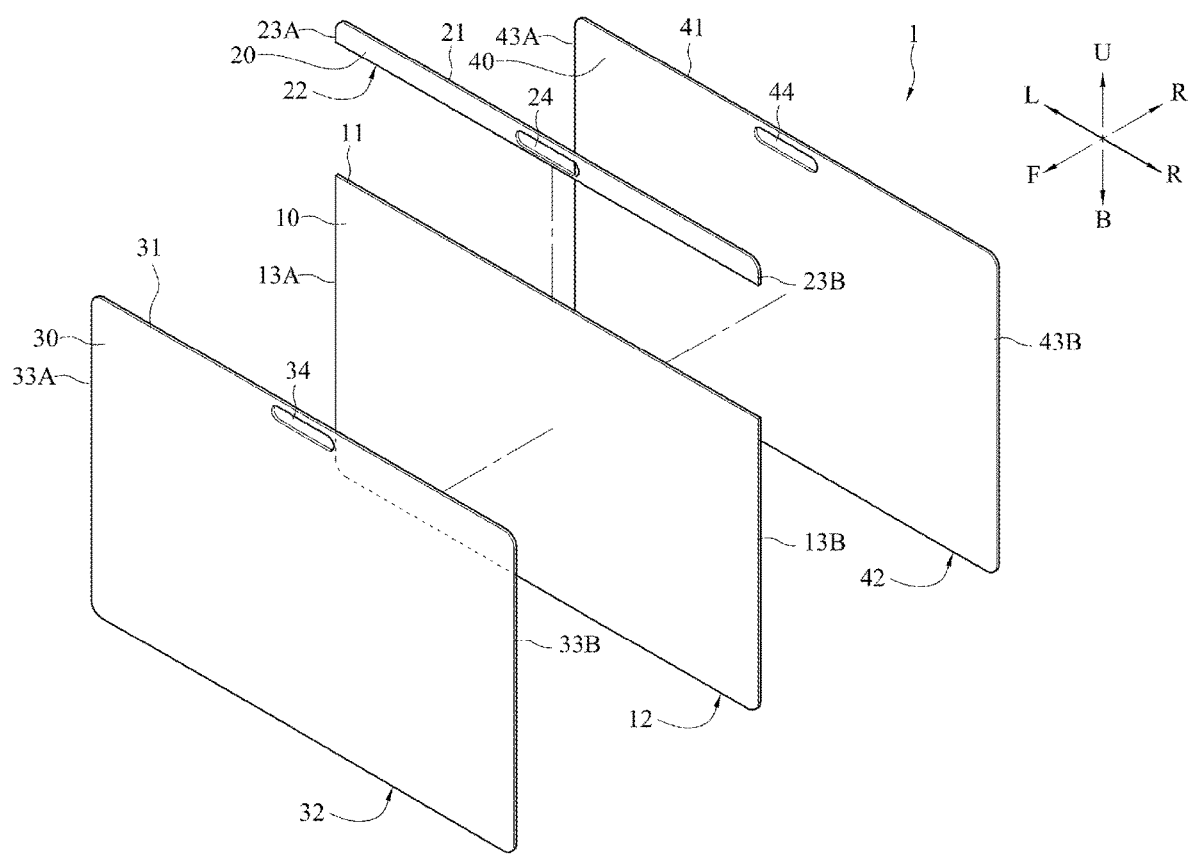
FIG. 1 is an exploded perspective view showing an embodiment of a screen protector 1 according to the present invention.

The technical means by which the present invention is intended to achieve the intended inventive purpose is further illustrated below with the drawings and the preferred embodiments of the present invention. The accompanying drawings are provided for reference and description to the detailed description and technical content of the present invention only and are not intended to limit the present invention. In the following description of the present invention, the orientation or positional relationships indicated by the terms "up", "down", "left", "right", "top", "bottom", "inside", and "outside", etc., are based on the orientation or positional relationships shown in the drawings, and are merely intended to facilitate simplifying the description of the present invention, instead of indicating that the devices or components in the description must have a specific orientation and are constructed and operated in a specific orientation, and thus cannot be understood as the limitations of the present invention.

The screen protector disclosed in the embodiments of the present invention is based on the following design considerations. First, due to the trend of thinning of the hardware design of the electronic device, when the screen (located on the upper cover) of the electronic device such as a notebook computer is closed, the space formed by the inner surface of the screen and the inner surface of the keyboard is very limited. If a decorative or functional protruding structure is disposed on the outer surface of the peep-protection sheet, the upper cover of the notebook computer cannot be smoothly closed, and the sleep program executed by relevant hardware and software of the notebook computer which are originally triggered by closing the upper cover would be hindered. Therefore, the screen protector of the embodiments of the present invention tends not to have a protruding structure attached to the outer surface thereof to further reduce the thickness of the screen protector. However, this will encounter major technical problems.

Because the key materials, key technologies and mass production technologies for producing the viewing angle limitation effect of the peep-protection sheet have been mastered by a few material companies in the past 20 years, the development of the attachment technology of the peep-protection sheet to the screen of the electronic device is only limited to attaching a protruding structure at the outer surface of the peep-protective sheet. Therefore, the screen protector of the present invention must overcome the technical development limitations that are sustainable for a long term, that is, the functional components (such as ferromagnetic attaching members) and/or decorative components (such as artificial leather or a colored paint layer) can only be designed outside the peep-protection sheet. In order to solve such a problem, the present invention integrates the functional components (such as ferromagnetic attaching members) and/or decorative members (such as a pigment/paint layer or a pattern film) with a grating sheet inside the peep-protection sheet in the same layer, so as to achieve the overall thinning effect of the screen protector. Furthermore, the upper cover can be smoothly closed when the screen protector is used to adsorb the screen of the notebook computer, so that the notebook computer can smoothly trigger the sleep program. Moreover, the solution that the screen protector can achieve the effect of easy and quick disassembly and assembly, without adding an external protruding structure can achieve the effect of providing the functional components and the decorative components on the screen protector. Then, another technical problem that needs to be overcome when the functional components and the grating sheet are integrated on the same layer is how to make two independent planar components of different materials not be inclined or bent at the junction.

The following embodiment drawings of the present invention will be described with reference to the coordinate system of FIG. 1. The arrow L direction represents the left side, the arrow R direction represents the right side, the arrow U direction represents the upper side or the top side, and the arrow B direction represents the lower side or the bottom side, the arrow F direction represents the front side or the front surface, and the arrow R direction represents the back side or the rear surface.

FIG. 1 is an exploded perspective view showing an embodiment of a screen protector 1 according to the present invention. In this embodiment, the screen protector 1 is substantially rectangular and comprises a grating sheet 10 and a first attaching member 20 disposed between a transparent first outer cover film 30 and a second outer cover film 40.

A manufacturing method of a screen protector of the present invention is described in detail below. The manufacturing method comprises the following steps:

A sheet punching step S1: sheets constituting the first outer cover film, the second outer cover film, the grating sheet, and the first attaching member are cut into specific sizes, respectively.

A functional layer forming step S2: the grating sheet and the attaching member are disposed and attached to a front surface of the second outer cover film to form the functional layer, and the attaching member is disposed adjacent to the grating sheet side-by-side.

A semi-finished product forming step S3: a lower surface of the first outer cover film is bonded to the grating sheet and the attaching member to form a semi-finished product.

A heating and pressing defoaming step S4: vacuum-pressing is performed on the semi-finished product under appropriate conditions, to remove bubbles inside the semi-finished product, and the surface of the semi-finished product is flattened to obtain the screen protector.

In the sheet punching step S1, the sheets constituting the first outer cover film 30, the second outer cover film 40, the grating sheet 10, and the first attaching member 20 are respectively cut into specific shapes by a punching machine, the height of a tool face of a cutting die used in the punching machine is 23.6 mm, and the inclination of tool points on both sides is 15°. In addition, during punching of the grating sheet 10, the punch angle must be adjusted according to the screen resolution of corresponding electronic device. For example, if the screen resolution is 1366×768, the punch angle is 11 degrees, and if the screen resolution is 1920× 1080, the punch angle is 15 degrees. In addition, the shape and size of the screen protector 1 correspondingly match those of a screen of the electronic device. In this embodiment, the grating sheet 10, the first outer cover film 30 and the second outer cover film 40 are substantially rectangular sheets respectively, and the first attaching member 20 is an elongated sheet, wherein the first outer cover film 30 and the second outer cover film 40 are of the same size, and shapes and sizes of the combined and spliced grating sheet 10 and the first attaching member 20 are the same as those of the first outer cover film 30 and the second outer cover film 40. Indifferent embodiments, the total thickness actually achieved by the screen protector 1 is preferably only about 0.4-0.50 mm plus or minus 5-10%, which is difficult to visually recognize the structure thereof. For convenience of description, the geometrical proportions of the screen protector 1 structure in the respective embodiment drawings are adjusted. Compared with the traditional peep-protection sheet, the functional component and the decorative component are disposed on the outer surface of 0.95-1.4 mm plus or minus 10-15%, and the screen protector 1 of the present invention substantially reduces the thickness by 58%-65%, and it conforms to the space application trend of thinning and narrow bezel structure on modern electronic devices.

Figure 2A:
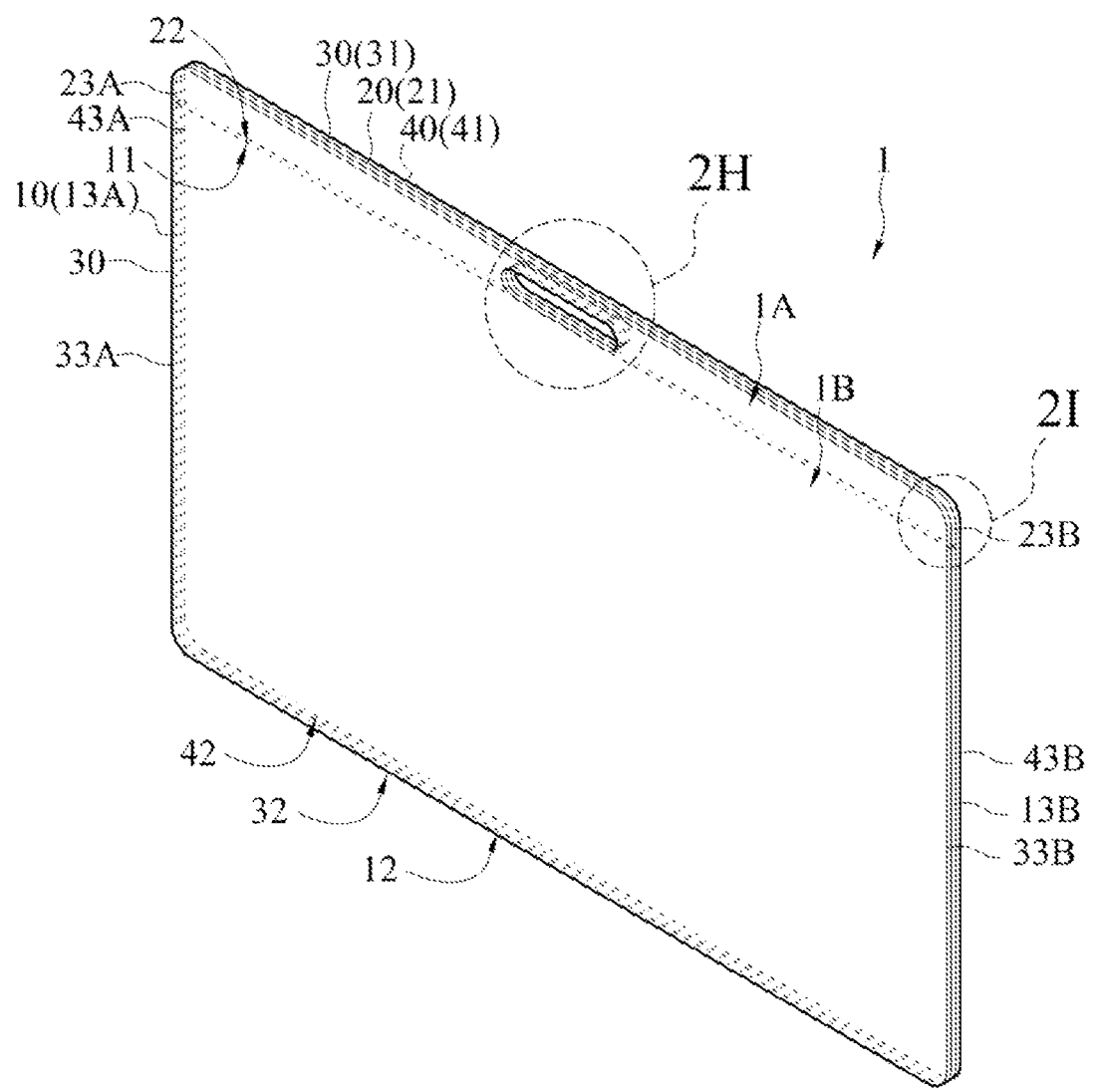
FIG. 2A is a perspective view showing an embodiment of the screen protector 1 according to the present invention.
Figure 2B:
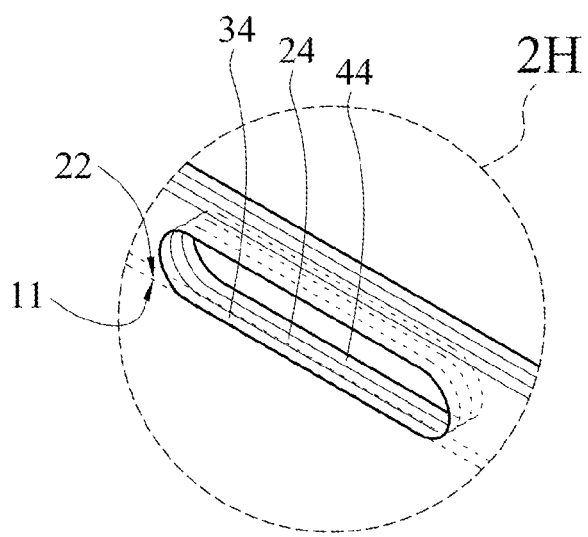
FIG. 2B is a partial enlarged view showing a region 2H in FIG. 2A.
Figure 2C:
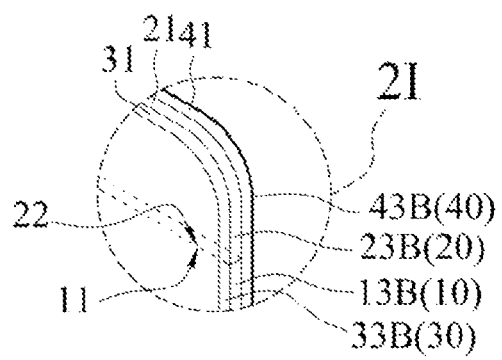
FIG. 2C is a partial enlarged view showing a region 21 in FIG. 2A.

Then, reference is made to FIGS. 1, 2A/2B/2C, and 3A together. FIG. 2A is a perspective view of an embodiment of a screen protector 1 of the present invention; FIG. 2B is a partial enlarged view of a region 2H in FIG. 2A; FIG. 2C is a partial enlarged view of the region 2I of FIG. 2A; and FIG.

3A is an exploded perspective view of the screen protector 1 and an electronic device 2 of FIG. 1.

In this embodiment, the grating sheet 10 and the first attaching member 20 are disposed vertically adjacent to each other side-by-side, and the first attaching member 20 is disposed above the grating sheet 10. In an embodiment, a bottom edge 22 of the first attaching member 20 is aligned with and adjacent to a top edge 11 of the grating sheet 10, and both may be adhesively fixed or merely adjacent to each other. In an example, two side edges 23A/23B of the first attaching member 20 can be vertically aligned with two side edges 13A/13B of the grating sheet 10, respectively. In a preferred embodiment, the attaching member 20 has the same or approximate thickness as the grating sheet 10, and the attaching member 20 can also have a smaller thickness than the grating sheet 10.

In the functional layer forming step S2, the two side edges 13A/13B and a bottom edge 12 of the grating sheet 10 are respectively aligned with and attached to two side edges 43A/43B and a bottom edge 42 of the second outer cover film 40, and the two side edges 23A/23B and a top edge 21 of the first attaching member 20 are respectively aligned with and attached to top sections of the top side edges 43A/43B and a top edge 41 of the second outer cover film 40, so that the grating sheet 10 and the first attaching member 20 form a functional layer in the same plane. Then, in the semi-finished molding step S3, two side edges 33A/33B and a bottom edge 32 of the first outer cover film 30 are respectively aligned with and attached to the side edges 13A/13B and the bottom edge 12 of the grating sheet 10, and the top sections of the top side edges 33A/33B and the top edge 31 of the first outer cover film 30 are respectively aligned with and attached to the two side edges 23A/23B and the top edge 21 of the first attaching member 20, thereby forming a semi-finished product of the screen protector 1.

Then, in the heating and pressing defoaming step S4, an appropriate pressure P and temperature T are applied to the semi-finished product for a vacuum-pressing duration X, to remove bubbles inside the semi-finished product, and the surface of the semi-finished product is flattened to obtain the screen protector 1. The pressure P, the temperature T, and the time X depend on the thickness and material of the sheet. For example, the pressure P is generally in the range of 0.5 to 30 $Kg/cm^2$, preferably in the range of 0.5 to 25 $Kg/cm^2$, more preferably in the range of 2.5 to 20 $Kg/cm^2$, and most preferably in the range of 2.5 to 15 $Kg/cm^2$. In addition, the temperature T is generally in the range of 30 to 90° C., preferably in the range of 35 to 80° C., more preferably in the range of 35° C. to 75° C., and most preferably in the range of 35° C. to 70° C. Moreover, the time X is generally in the range of 10 to 100 min, preferably in the range of 10 to 90 min, more preferably in the range of 20 to 90 min, and most preferably in the range of 25 to 80 min.

Through the steps, the top region of the first outer cover film 30, the first attaching member 20, and the top region of the second outer cover film 40 form adsorption zones 1A which are sequentially stacked and have corresponding areas, and the main region of the first outer cover film 30, the grating sheet 10, and the main portion of the second outer cover film 40 also form viewing zones 1B which are sequentially stacked and have corresponding areas, below the adsorption zones 1A.

Figure 3A:
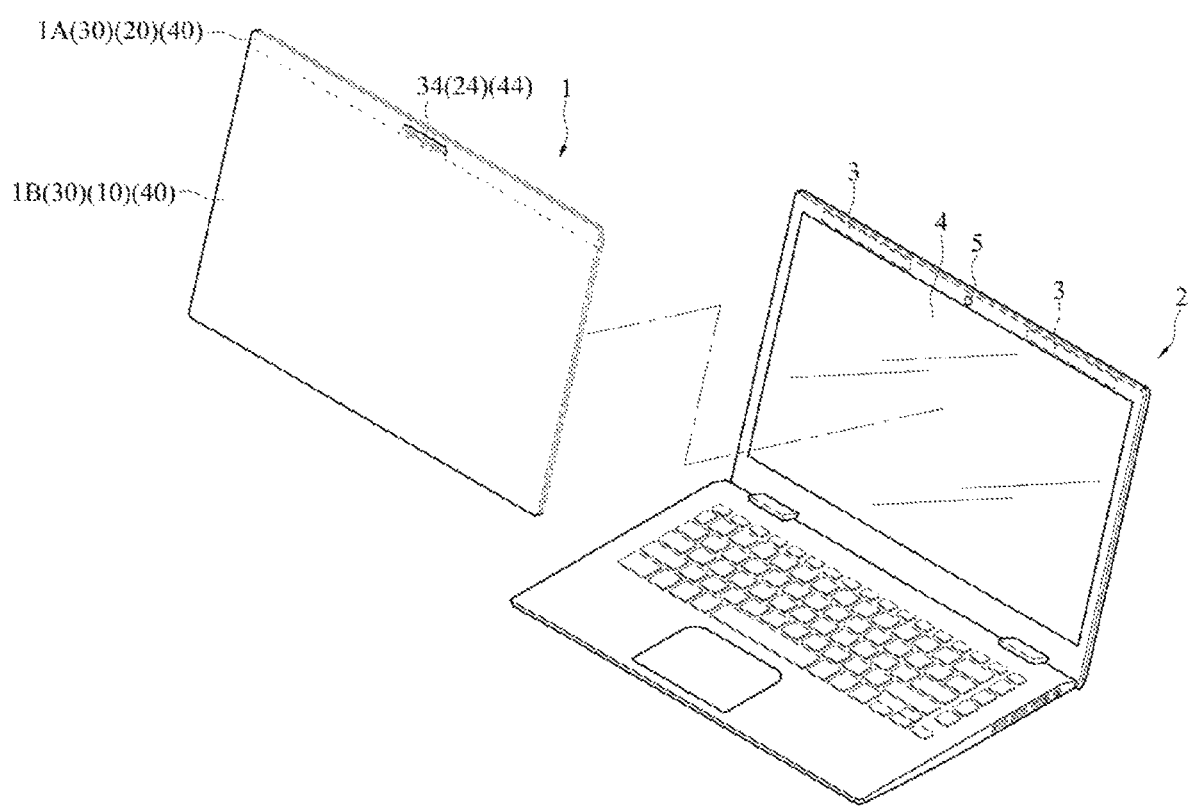
FIG. 3A is an exploded perspective view showing the screen protector 1 and an electronic device in FIG. 1.

Therefore, as shown in FIG. 3A, the first attaching member 20 is disposed in the adsorption zone 1A of the screen protector 1, so that the screen protector 1 can be correspondingly adsorbed to an attaching body 3 outside a screen 4 of an electronic device 2 through the first attaching member 20.

In this embodiment, the electronic device 2 is a notebook computer, and the attaching body 3 is disposed inside the electronic device 2 and located above the display screen 4 for aligning the attaching member 20 of the screen protector 1. In FIG. 3A, the attaching member 20 of the screen protector 1 and the attaching body 3 of the electronic device 2 can be respectively made of magnetic materials of different magnetic poles (for example, one of a group consisting of ferrite, aluminum-nickel-cobalt alloy, or rare-earth magnets or any combination thereof); or, one of the first attaching member 20 and the attaching body 3 is a magnet, and the other is a ferromagnetic member (for example, a single metal member or a multi-metal alloy member such as iron, nickel or cobalt that can be magnetically attracted, which can be used as a part of a casing or a structural member), so that the first attaching member 20 and the attaching body 3 can attract each other. In some embodiments, the first attaching member 20 can be realized by a thinned elongated metal sheet/metal strip, a magnetic/ferromagnetic sheet, or a coating containing a metal or magnetic/ferromagnetic material. Therefore, the first attaching member 20 can be adsorbed to the attaching body 3 by using the magnetic attraction principle when the screen protector 1 approaches the attaching body 3 of the electronic device 2 with the first attaching member 20, so that the adsorption zone 1A of the screen protector 1 is fixed on the electronic device 2, and the viewing zone 1B of the screen protector 1 covers the display screen 4 of the electronic device 2 to achieve the effect of avoiding peeping by others. In addition, if the user has the need for disassembly, the attaching member 20 of the screen protector 1 can be removed from the attaching body 3 of the electronic device 2, and the detachment is easy and quick.

Figure 3B:
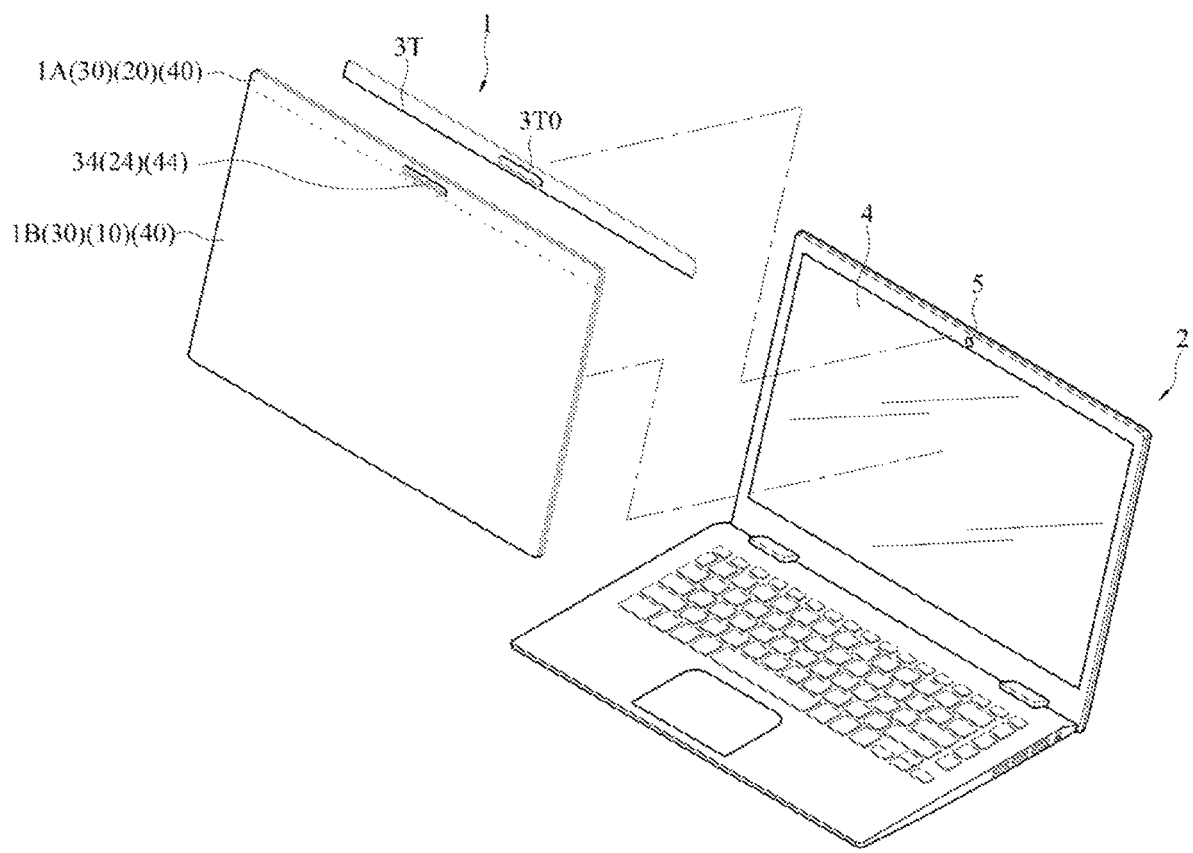
FIG. 3B is an exploded perspective view showing the screen protector 1 and the electronic device in FIG. 1.
Figure 3C:
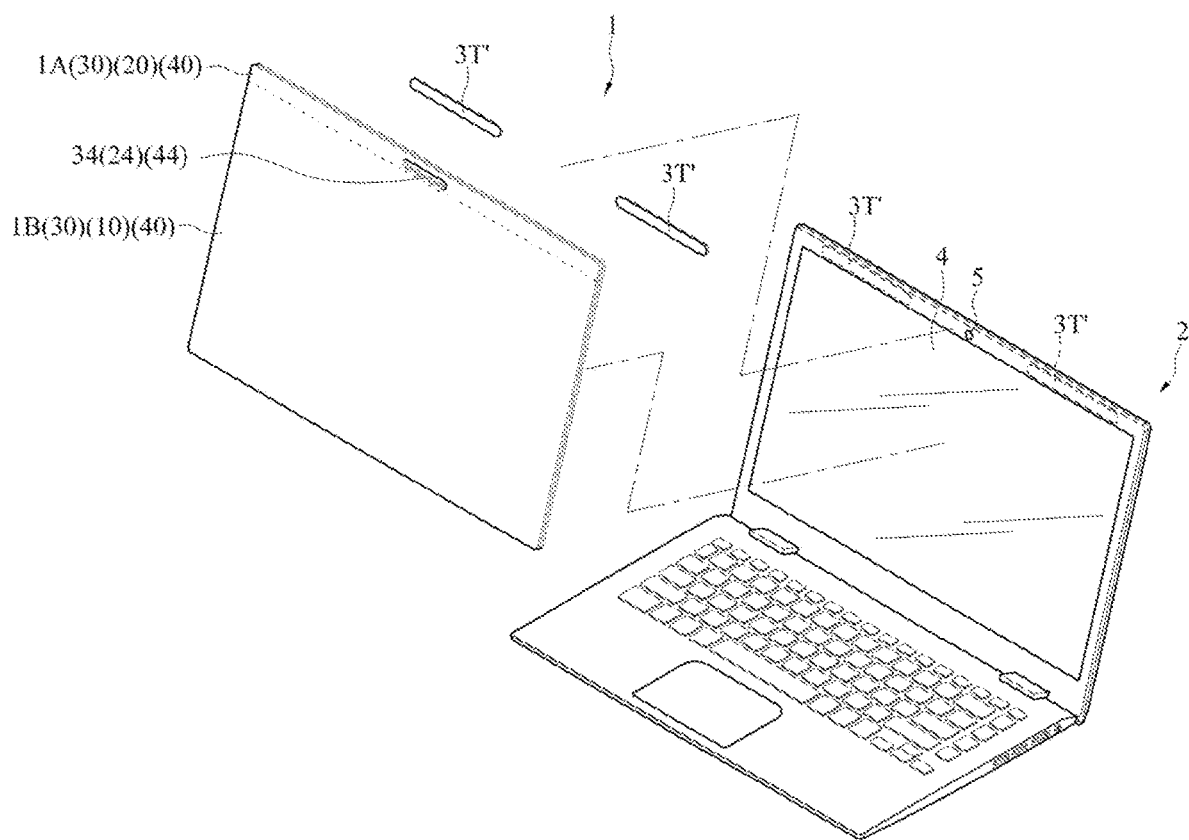
FIG. 3C is an exploded perspective view showing the screen protector 1 and the electronic device in FIG. 1.

FIGS. 3B and 3C are respectively exploded perspective views of the screen protector 1 and the electronic device 2 of FIG. 1. Different from FIG. 3A, in FIGS. 3B and 3C, no attaching member 3 is disposed outside the display screen 4 of the electronic device 2, and the screen protector 1 further includes a separate attaching body 3T or two attaching bodies 3T', the attaching body 3T/3T' has ferromagnetic properties and has an adhesive surface for adhering to the outside of the display screen 4 on the electronic device 2. In FIGS. 3B and 3C, the attaching member 20 and the attaching bodies 3T/3T' of the screen protector 1 can be respectively made of magnetic materials of different magnetic poles (for example, one of a group consisting of ferrite, aluminum-nickel-cobalt alloy, or rare-earth magnets or any combination thereof); or one of the first attaching member 20 and the attaching bodies 3T/3T' is a magnet, and the other is a ferromagnetic member (for example, a single metal member or a multi-metal alloy member such as iron, nickel or cobalt that can be magnetically attracted), so that the attaching member 20 and the attaching bodies 3T/3T' are attract each other. In some embodiments, the ferromagnetic properties of the attaching member 20 and the attaching bodies 3T/3T' can be realized by a thinned elongated metal sheet/metal strip, a magnetic/ferromagnetic sheet, or a coating containing a metal or magnetic/ferromagnetic material. In some embodiments, the thickness of the attaching member 20 can be, for example, 0.1-0.5 mm plus or minus 5-20%, preferably 0.2-0.35 mm plus or minus 5-20%, and more preferably 0.30-0.35 mm plus or minus 5-20%. In different embodiments, the thickness of the attaching member can be, for example, between 0.4 mm and 0.7 mm, or in the range of 0.4, 0.5, 0.6 or 0.7 mm plus or minus 5-20%.

In addition, the attaching member 20 of the screen protector 1 in FIG. 3A is formed with an opening 24 corresponding to a visual sensor 5 of the electronic device 2 (for example, a camera including a CCD or CMOS component), the first outer cover film 30 and the second outer cover film 40 are also respectively formed with openings 34/44 corresponding to the opening 24 of the first attaching member. Thus, a hollow channel formed by the opening 34, the opening 24 and the opening 44 which are sequentially communicated can prevent the visual sensor 5 from being covered by the screen protector 1 to lose its function, after the screen protector 1 is mounted on the electronic device 2. The foregoing opening 34, opening 24 and opening 44 are respectively through holes defined by a closed inner edge. Certainly, the opening 24 of the first attaching member 20 and the openings 34/44 of the first outer covering 30 and the second outer covering 40 can be formed in different shapes or in different positions, and other holes can be added as needed, so as to correspond to the visual sensor 5 or other functional components (such as a light source, a headphone jack or a function button) of the electronic device 2. In FIG. 3B, the attaching body 3T has a shape and size corresponding to the attaching member 20 (extending along the long side of the grating sheet 10 in a strip shape), and the attaching body 3T has an opening 3T0 corresponding to the opening 24 of the attaching member 20 and the openings 34/44 of the first outer cover film 30 and the second outer cover film 40 corresponding to the visual sensor 5 of the electronic device 2 to avoid covering it. In FIG. 3C, the two attaching bodies 3T' whose width and length are less than half of the attaching member 20 are first attached to the outside of the display screen 4 of the electronic device 2, and the left and right sides of the visual sensor 5, to avoid covering the visual sensor 5, and can be adsorbed corresponding to the attaching member 20. In other words, the attaching body of the embodiments of the present invention is adsorbed corresponding to the attaching member, and is affixed to the electronic device by default, or is freely attached to the outer surface of the electronic device.

Figure 4A:
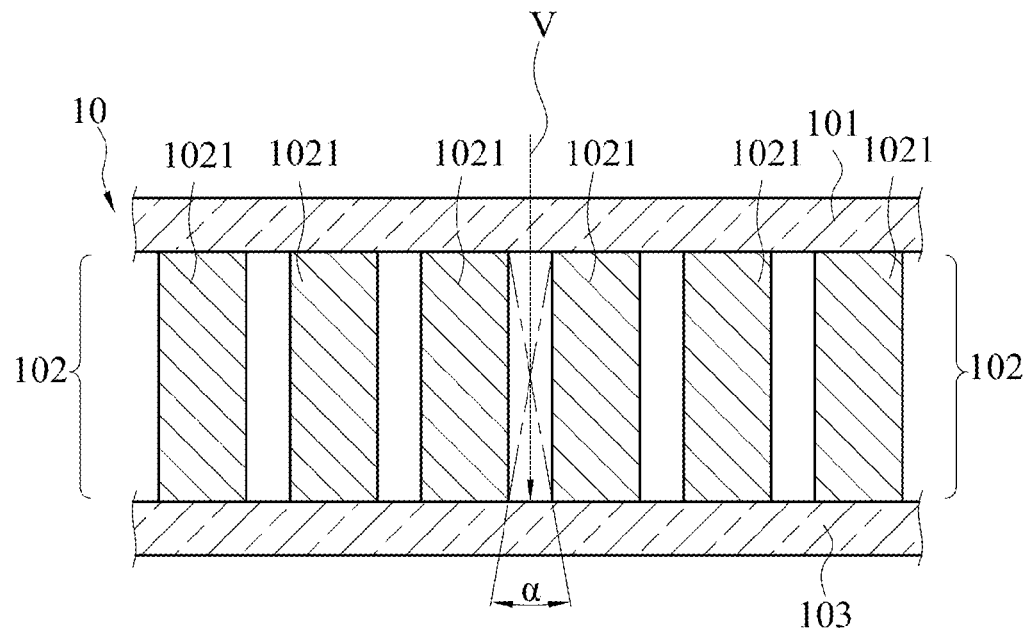
FIG. 4A is a sectional view showing an embodiment of a grating sheet in FIG. 1.
Figure 4B:
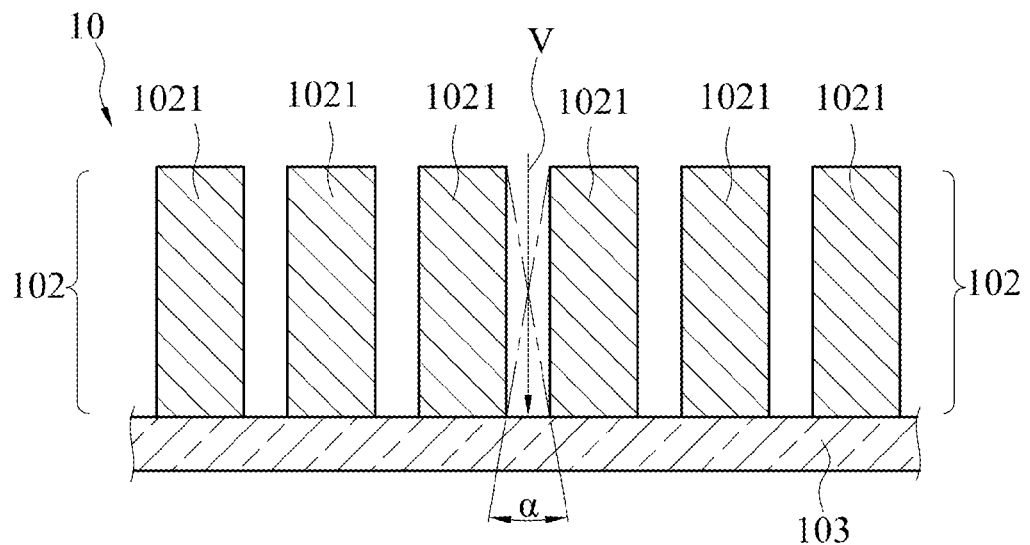
FIG. 4B is a sectional view showing another embodiment of the grating sheet in FIG. 1.

Referring to FIGS. 4A and 4B, FIG. 4A is a sectional view of an embodiment of the grating sheet 10 of FIG. 1, and FIG. 4B is a sectional view of another embodiment of the grating sheet 10 of FIG. 1.

As shown in FIG. 4A, the grating sheet 10 includes two outer layers 101, 103 and a grating layer 102, but the grating sheet 10 can also have only one outer layer 103, as shown in FIG. 4B, this embodiment is not limited thereto. The outer layers 101, 103 are resin layers made of high light transmissive materials. For example, the outer layers 101, 103 are made of Polyimide (PI), Polyethylene Terephthalate (PET), and Polycarbonate (PC), Poly-Methyl Methacrylate (PMMA), and Triacetyl Cellulose (TAC). The grating layer 102 is fixed between the two outer layers 101, 103. For example, in FIG. 4A, the outer layers 101, 103 are respectively adhered to two opposite surfaces of the grating layer 102; or as shown in FIG. 4B, the grating layer 102 is fixed on the outer layer 103.

In FIGS. 4A and 4B, the grating layer 102 of the grating sheet 10 includes a plurality of opaque grating walls 1021, which are arranged according to the Micro-louver principle. The light can be limited to a specific angle α by setting the grating walls 1021 in parallel and equidistantly (i.e., an upright louver structure). The grating walls 1021 can be directly printed on the outer layer 103 in a three-dimensional printing manner (FIG. 4B), or the outer layer 101 is attached after the grating walls 1021 are formed, so that the grating layers 102 (the grating walls 1021) are located between the two outer layers 101, 103. In another embodiment, the grating layer 102 may be formed by slitting repeatedly stacked transparent and opaque materials. In other embodiments, the grating layer 102 is adhered to the outer layers 101, 103 through an adhesive layer, respectively. The grating sheet 10 has the same or approximate thickness as the attaching member 20. In some embodiments, the overall thickness of the grating sheet 10 is in the range of 0.25, 0.30 to 0.35 mm plus or minus 5-20%. In different embodiments, the thickness of the attaching member can be, for example, between 0.25 mm and 0.7 mm, or in the range of 0.4, 0.5, 0.6 or 0.7 mm plus or minus 5-20%. Thus, the grating sheet 10 can only provide a visible range of a certain angle α, as shown by arrow V in the figure, which is the angle of facing the grating layer 102 (i.e., a zero angle), since the light is not blocked, the visibility is not affected. If the angle α deviation is larger, the brightness is lower, so that the effect of preventing peep and information confidentiality can be fully achieved. The change in the viewing angle of the grating sheet 10 can achieve the effect of preventing peep, which is closely related to the visible light transmittance of the grating sheet 10 at various viewing angles. For example, in a set of embodiments, the visible light of 550 nm wavelength is used to experiment with the viewing zone 1B of the screen protector 1. At the viewing angle 0, several sets of light transmittance data such as 52.13%, 54.16%, 56.66%, 59.86%, 61.55% and 64.22% can be obtained. At the viewing angle of 15°, the light transmittance data can still reach the level of 33.10%, 37.28% or 46.8%. However, once the left/right viewing angle of 30° is reached, the light transmittance data is sharply reduced below 10%, for example, 2.55%, 5.10% or 8.63%. In these embodiments, the allowable viewing angle range of the viewing zone 1B of the screen protector 1 is only about 30 degrees to the left and right, for a total allowable viewing angle range of about 60 degrees. In other words, the grating sheet 10 and the grating layer 102 thereof are configured to limit the light passing through the viewing zone 1B to an allowable viewing angle range.

The first outer cover film 30 and the second outer cover film 40 of an embodiment of the present invention can be, for example, made of PI, PET, PC, PMMA and TAC, and the materials constituting the first outer cover film 30 and the second outer cover film 40 may be the same or different. For the thicknesses of the first outer cover film 30 and the second outer cover film 40, in some embodiments, the thicknesses of the first outer cover film 30 and the second outer cover film 40 can be, for example, in the range of 0.05, 0.075, 0.10, or 0.125 mm plus or minus 5-20%, which may include or may not include the thicknesses of the first outer cover film 30 and the second outer cover film 40 themselves and one or more coatings. The grating sheet 10 itself does not have sufficient structural strength to maintain the screen protector 1 in a flat plane when the grating sheet 10 itself, in particular only having a single outer layer 103, provides a support surface for the grating layer 102. Therefore, with the front and back attachment of the first outer cover film 30 and the second outer cover film 40, the grating sheet 10 and the attaching member 20 can be maintained in the flat plane, that is, the screen protector 1 can be maintained as a whole in the flat plane, thereby conforming to the functional requirement of being flat on the display screen 4 of the electronic device 2 without warping. More importantly, the front and back attachment of the first outer cover film 30 and the second outer cover film 40 requires sufficient structural strength so that two independent planar components, i.e., the grating sheet 10 and the attaching member 20 are not inclined or bent at the junction. In addition, in order to meet the requirements of no fingerprint left after use, low glare, low reflected light, and scratch resistance, etc., the inner surfaces and/or the outer surfaces of the first outer cover film 30 and the second outer cover film 40 may have one or more coatings, the coating can be selected from one of a group consisting of an anti-fingerprint coating (of an ultra-low frictional coefficient), an anti-glare coating, an anti-reflection coating, an anti-blue light coating, and a hard coating, or any combination thereof. In some experimental examples, the anti-reflection coating can increase the transmittance of the screen protector 1 by 8-12%, thereby improving the low transmittance of the conventional screen protector 1.

Figure 5:
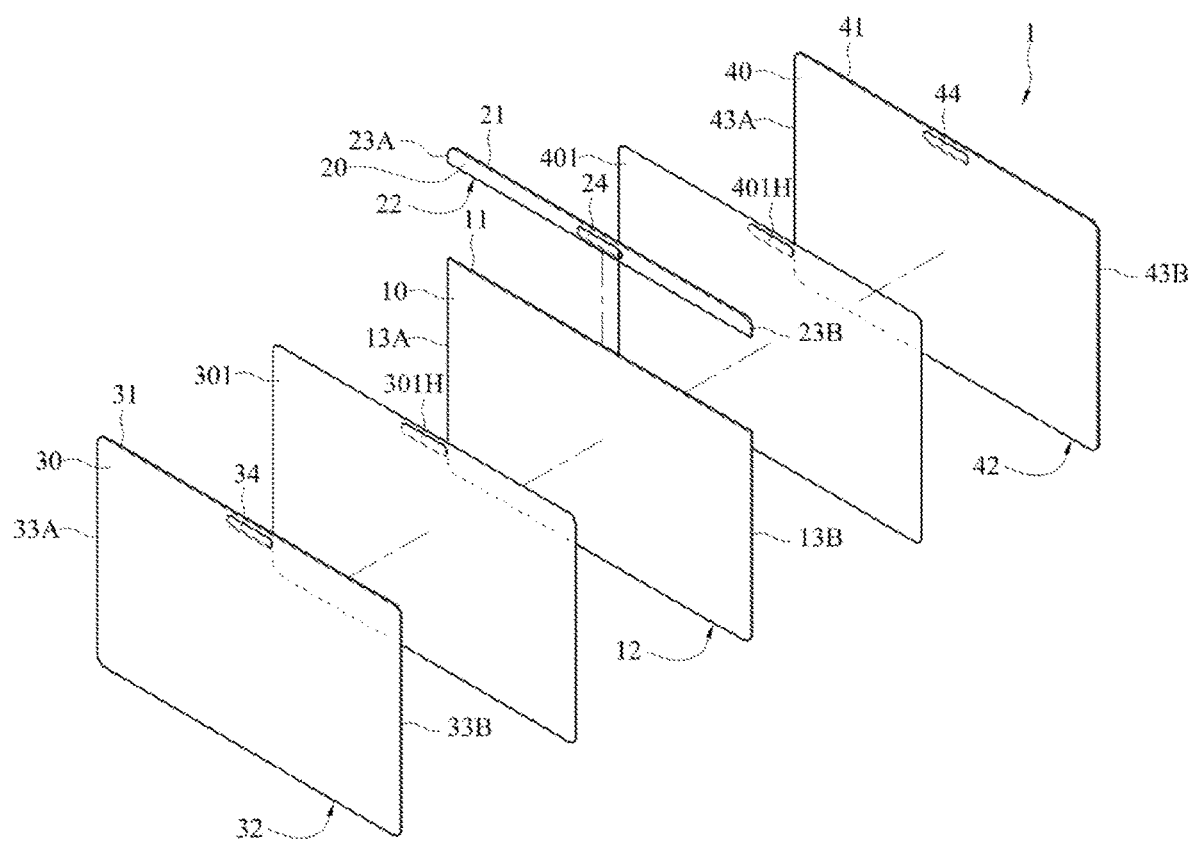
FIG. 5 is an exploded perspective view showing another embodiment of the screen protector 1 according to the present invention.

In addition, please refer to FIG. 5. FIG. 5 is an exploded perspective view of another embodiment of the screen protector 1 of the present invention. In this embodiment, the present invention provides another manufacturing method of a screen protector as follows:

A sheet punching step M1: sheets constituting the first outer cover film, the second outer cover film, the grating sheet, and the first attaching member are cut into specific sizes, respectively.

An adhesive layer applying step M2: a viscous adhesive material is applied to a rear surface of the first outer cover film and a front surface of the second outer cover film, to form a first adhesive layer and a second adhesive layer.

A functional layer forming step M3: the grating sheet and the attaching member are disposed and attached to the front surface of the second outer cover film to form the functional layer, and the attaching member is disposed adjacent to the grating sheet side-by-side.

A semi-finished product forming step M4: the rear surface of the first outer cover film is bonded to the grating sheet and the attaching member to form a semi-finished product.

A heating and pressing defoaming step M5: vacuum-pressing is performed on the semi-finished product under appropriate conditions, to remove bubbles inside the semi-finished product, and the surface of the semi-finished product is flattened to obtain the screen protector.

In this embodiment, the screen protector 1 further comprises a transparent first adhesive layer 301 and a second adhesive layer 401 respectively configured to attach the grating sheet 10 and the first attaching member 20 between the first outer cover film 30 and the second outer cover film 40, so that the screen protector 1 as a whole has a certain structural strength and can be maintained in the flat plane. More importantly, the first outer cover film 30 and the second outer cover film 40 as well as the front and back attachment of the first adhesive layer 301 and the second adhesive layer 401 can further provide sufficient structural strength, so that two independent planar components, i.e., the grating sheet 10 and the first attaching member 20 are not inclined or bent at the junction. To achieve this objective, in some embodiments, the overall thickness of the first outer cover film 30 and the second outer cover film 40 as well as the first adhesive layer 301 and the second adhesive layer 401 at least has to reach ⅛ of the thickness of the grating sheet 10 and the first attaching member 20. In different embodiments, the overall thickness of the first outer cover film 30 and the second outer cover film 40 as well as the first adhesive layer 301 and the second adhesive layer 401 can be ⅐, ⅙, ⅕, ¼, ⅓, ½ or 1/1 of the thickness of the grating sheet 10 and the first attaching member 20, the key is that the thinner the overall thickness is, the higher the structural strength of the first outer cover film 30 and the second outer cover film 40 as well as the first adhesive layer 301 and the second adhesive layer 401 is required. Moreover, the first adhesive layer 301 and the second adhesive layer 401 use an optical cured adhesive of higher hardness after curing, which also helps to reduce the individual and overall thicknesses of the first outer cover film 30 and the second outer cover film 40 as well as the first adhesive layer 301 and the second adhesive layer 401. The outer peripheries of the first adhesive layer 301 and the second adhesive layer 401 correspond to the outer peripheries of the first adhesive layer 301 and the second adhesive layer 401. The first adhesive layer 301 is located between the outer cover film 30 and the grating sheet 10/attaching member 20 for adhering the grating sheet 10 and the first attaching member 20 to the outer cover film 30. The second adhesive layer 401 is located between the grating sheet 10 and the first attaching member 20 and the outer cover film 40 for adhering the grating sheet 10 and the first attaching member 20 to the outer cover film 40. In some embodiments, the first adhesive layer 301 and the second adhesive layer 401 are realized by an Optical Clear Adhesive (OCA), for example, an optical acrylic adhesive sandwiched between two release films, and can be cut and formed using a punching machine. During processing, a release film is peeled off, and the other release film is peeled off after the first side is attached, to attach the second side. In an embodiment, the thicknesses of the first adhesive layer 301 and the second adhesive layer 401 are in the range of about 0.025, 0.035, 0.05, or 0.075 mm plus or minus 5-20%. In FIG. 5, the first adhesive layer 301 and the second adhesive layer 401 are respectively formed with openings 301H and 401H, and the sizes, shapes and positions thereof correspond to the openings 34/44 of the first outer cover film 30 and the second outer cover film 40 and the opening 24 of the attaching member 20. Similar to the opening 34, the opening 24, and the opening 44, the openings 301H and 401H are also through holes defined by a closed inner edge, respectively. In addition, upon completion of the vacuum-pressing, the overall structural strength of the screen protector can be further enhanced by UV light irradiation.

The configuration position/size/shape of the attaching body and the visual sensor (or other functional components) at the periphery of the display screen of the electronic device may be different. Therefore, the structure of the screen protector 1 needs to be slightly adjusted so that the screen protector 1 can correspond to the attaching body adsorbed at the periphery of the display screen, the viewing zone 1B can correspond to the display screen, and the opening 34, the opening 24 and the opening 44 of the adsorption zone 1A can correspond to the visual sensor (or other functional components), and further description is made according to the following embodiments and related drawings.

Figure 6:
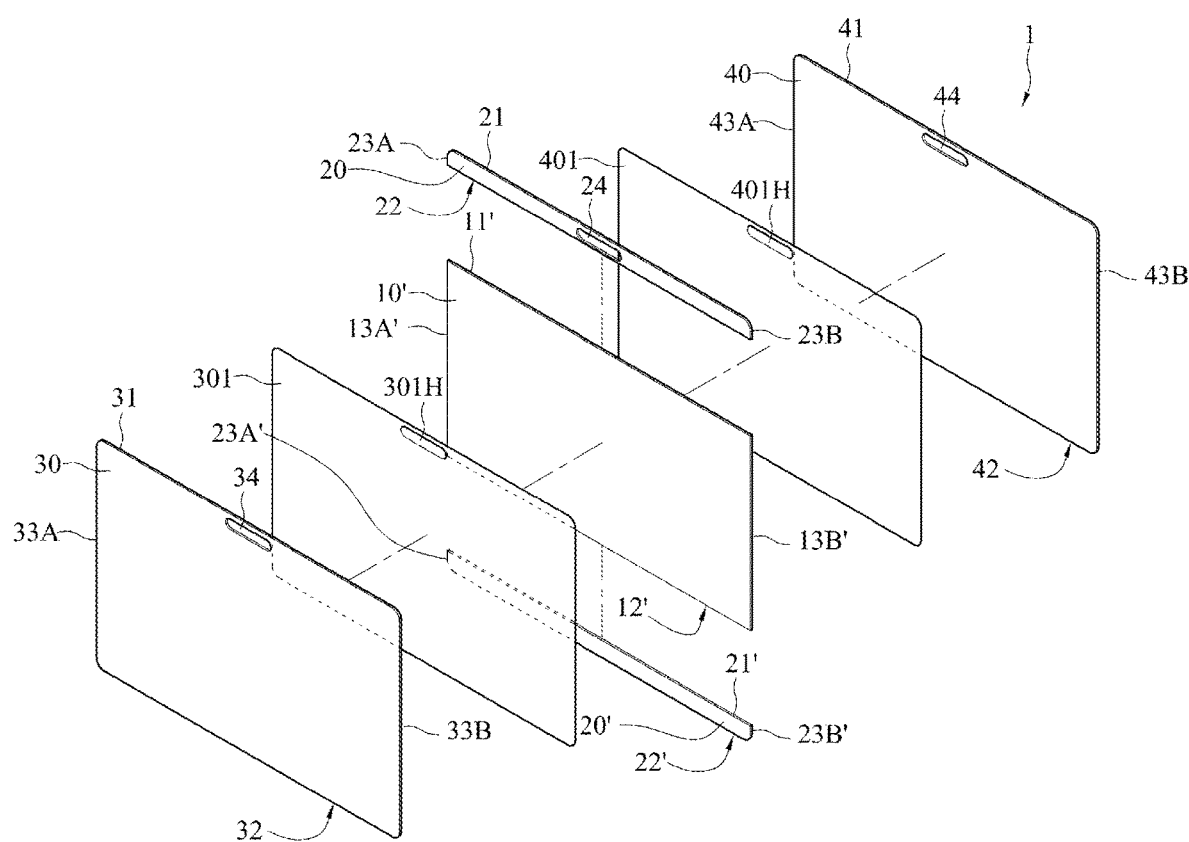
FIG. 6 is an exploded perspective view showing another embodiment of the screen protector 1 according to the present invention.

FIG. 6 is an exploded perspective view of another embodiment of the screen protector 1 of the present invention. In FIG. 6, the screen protector 1 includes a first attaching member 20, a grating sheet 10' and a second attaching member 20' sequentially arranged from top to bottom and disposed between the first outer cover film 30 and the second outer cover film 40. Specifically, the grating sheet 10' is disposed between the first attaching member 20 and the second attaching member 20', and is then coated together between the transparent first adhesive layer 301 and the second adhesive layer 401. The first outer cover film 30 and the second outer cover film 40 are then attached to the outside of the first adhesive layer 301 and the second adhesive layer 401. The second attaching member 20' is located below the grating sheet 10'. The arrangement is such that the screen protector 1 can also correspond to the attaching body (not shown) disposed inside the electronic device in an attaching mode and located below the display screen. The outer peripheries of the first adhesive layer 301 and the second adhesive layer 401 correspond to the outer periphery of the first adhesive layer 301/the second adhesive layer 401. The structures and the relative relationship of the first adhesive layer 301 and the second adhesive layer 401 are as described above, for convenience of explanation, in the following description of the structural relationships of other components, the first adhesive layer 301 and the second adhesive layer 401 are omitted. As shown in FIG. 6, the first attaching member 20, the grating sheet 10' and the second attaching member 20' are disposed vertically adjacent to each other side-by-side; that is, the bottom edge 22 of the first attaching member 20 is aligned with and adjacent to the top edge 11' of the grating sheet 10', and both may be adhesively fixed or merely adjacent to each other; and the top edge 21' of the second attaching member 20' is aligned with and adjacent to the bottom edge 12' of the grating sheet 10', and both may be adhesively fixed or merely adjacent to each other. In FIG. 6, the top sections of the two side edges 33A/33B of the first outer cover film 30, the two side edges 23A/23B of the first attaching member 20, and the top sections of the two side edges 43A/43B of the second outer cover film 40 are sequentially aligned horizontally, respectively. The main sections of the two side edges 33A/33B of the first outer cover film 30, the two side edges 13A'/13B' of the grating sheet 10' and the main sections of the two side edges 43A/43B of the second outer cover film 40 are sequentially aligned horizontally, respectively. Moreover, the lower sections of the two side edges 33A/33B of the first outer cover film 30, the two side edges 23A'/23B' of the second attaching member 20' and the lower sections of the two side edges 43A/43B of the second outer cover film 40 are sequentially aligned horizontally, respectively. Similarly, the top edge 31 of the first outer cover film 30, the top edge 21 of the first attaching member 20, and the top edge 41 of the second outer cover film 40 are sequentially aligned horizontally, respectively. Similarly, the bottom edge 32 of the first outer cover film 30, the bottom edge 22' of the second attaching member 20' and the bottom edge 42 of the second outer cover film 40 are sequentially aligned horizontally, respectively. The technical solution of FIG. 3B is adjusted and can be applied to the embodiment of FIG. 6, that is, for the case where no attaching body is disposed outside the display screen of the electronic device. The screen protector 1 in FIG. 6 can further include a separate attaching body 3T in FIG. 3B attached to the top side of the display screen of the electronic device and corresponding to the shape and size of the first attaching member 20 in FIG. 6, and can further include another attaching body attached to the bottom side of the display screen of the electronic device and corresponding to the shape and size of the second attaching member 20' in FIG. 6, so that the attaching bodies can be adsorbed to each other. Similarly, the technical solution of FIG. 3C is adjusted and can be applied to the embodiment of FIG. 6, that is, for the case where no attaching body is disposed outside the display screen of the electronic device. The screen protector 1 in FIG. 6 can further include a separate attaching body 3T' in FIG. 3C correspondingly attached to the first attaching member 20 in FIG. 6, and can further include another attaching body corresponding to the shape and size of the second attaching member 20' in FIG. 6, so that the attaching bodies can be adsorbed to each other.

Figure 7A:
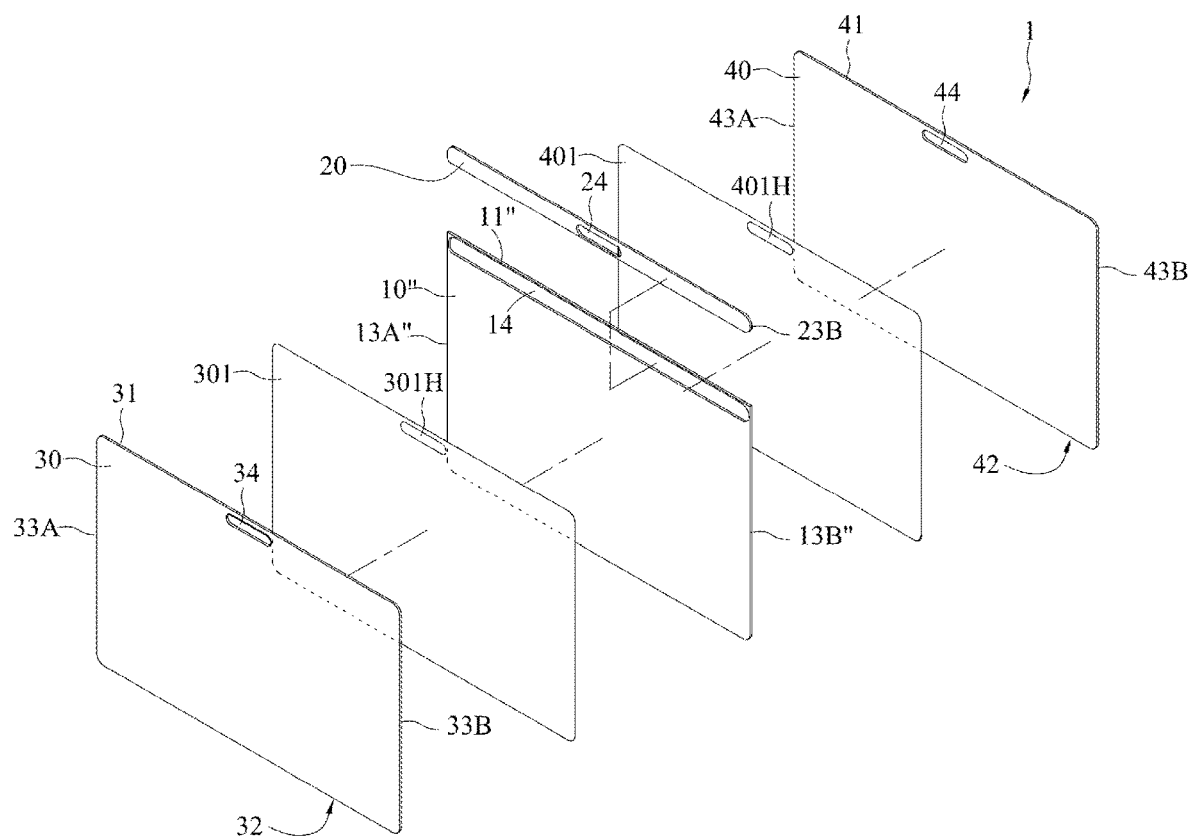
FIG. 7A is an exploded perspective view showing another embodiment of the screen protector 1 according to the present invention.
Figure 7B:
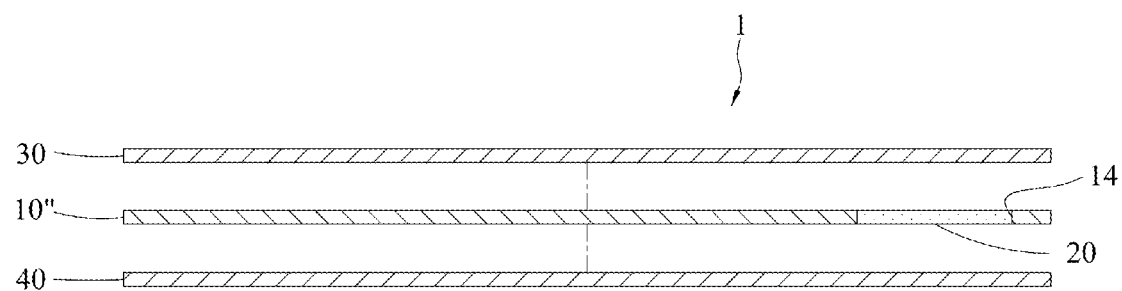
FIG. 7B is a cross-sectional view of the screen protector 1 of FIG. 7A.

FIGS. 7A and 7B are perspective exploded views of another embodiment of the screen protector 1 of the present invention. The elements of FIGS. 7A and 7B identical to that of FIG. 5 are denoted by the same numerical, and the descriptions of them are thus omitted. The difference in FIGS. 7A and 7B is that a receiving groove 14 is formed on the grating sheet 10". The receiving groove 14 is located near a top edge 11" of the grating sheet 10". The first attaching member 20 is received in and fitted to the receiving groove 14 in such a manner that a surface of the first attaching member 20 is aligned with a surface of the grating sheet 10". The grating sheet 10" along with the first attaching member 20 are covered by the first adhesive layer 301 and the second adhesive layer 401 on opposite sides. The first outer cover film 30 and the second outer cover film 40 are adhered on the first adhesive layer 301 and the second adhesive layer 401 respectively. In this embodiment, the receiving groove 14 is located near the top edge 11" of the grating sheet 10" and extends along the top edge 11". Two ends of the receiving groove 14 are closed to two side edges 13A"/13B" of the grating sheet 10". When the screen protector 1 is placed on an electronic device, the first attaching member 20 corresponds to an optical sensor such as a front lens. Therefore, an opening 24 is formed on the first attaching member 20 for external light to pass therethrough and be received by the optical sensor.

Figure 8:
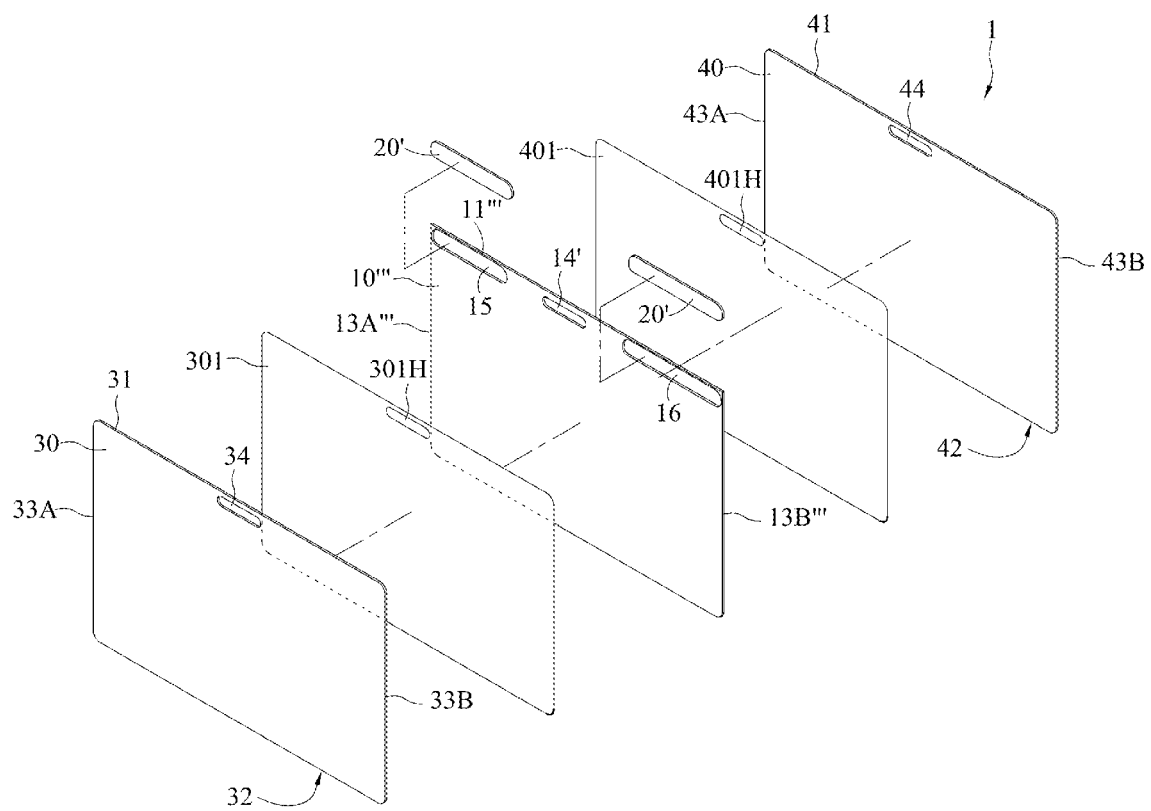
FIG. 8 is an exploded perspective view showing another embodiment of the screen protector 1 according to the present invention.

FIG. 8 is a perspective exploded view of another embodiment of the screen protector 1 of the present invention. The elements of FIG. 8 identical to that of FIGS. 7A and 7B are denoted by the same numerical, and the descriptions of them are thus omitted. The difference in FIG. 8 is that a first receiving groove 15 and a second receiving groove 16 is formed on the grating sheet 10'''. The first attaching member comprises two half attaching members 20', which are received in and fitted to the first receiving groove 15 and the second receiving groove 16 in such a manner that surfaces of the half attaching members are aligned with a surface of the grating sheet 10'''. The grating sheet 10''' along with the first attaching member 20' are covered by the first adhesive layer 301 and the second adhesive layer 401 on opposite sides. The first outer cover film 30 and the second outer cover film 40 are adhered on the first adhesive layer 301 and the second adhesive layer 401 respectively. In this embodiment, an opening 14' is formed on the grating sheet 10''' near the top edge 11''' and corresponds to an optical sensor, such as a front lens, for external light to pass therethrough and be received by the optical sensor. The opening 14' is located between the first receiving groove 15 and the second receiving groove 16, which extend along a top edge 11''' of the grating sheet 10'''.

Figure 9:
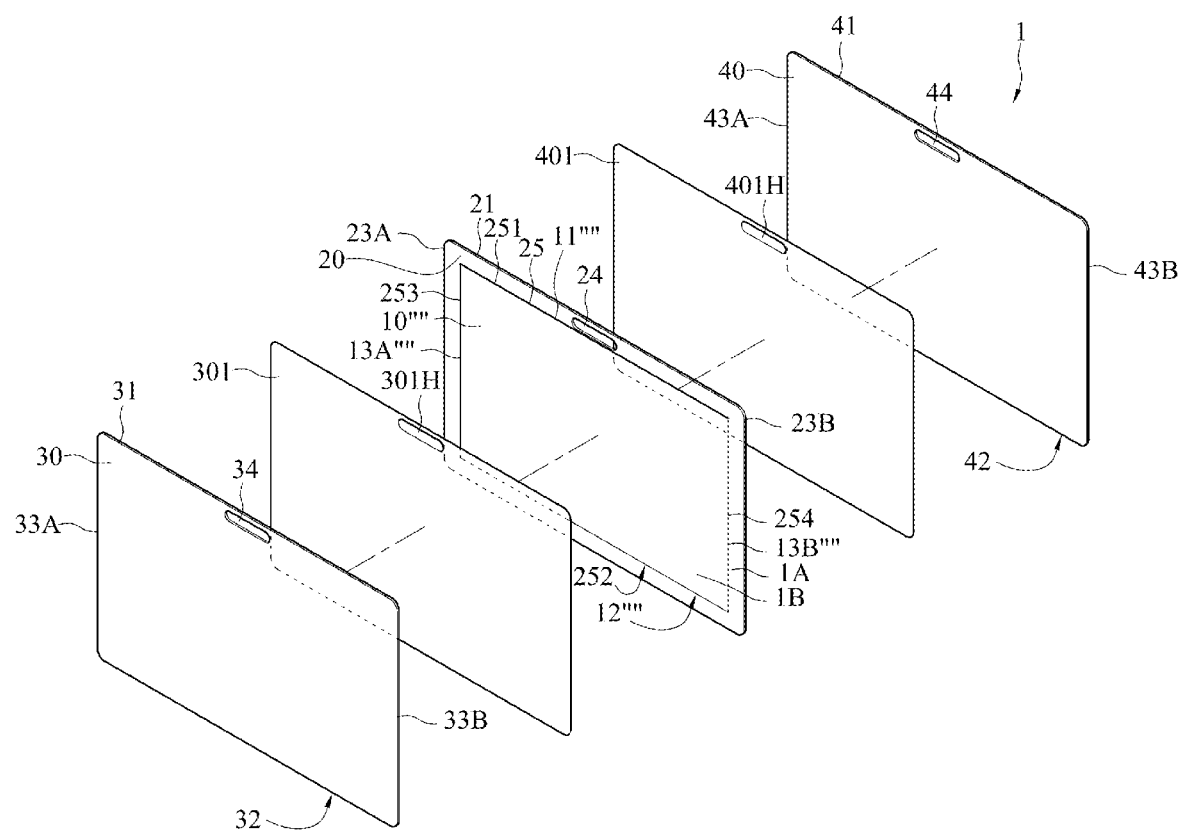
FIG. 9 is an exploded perspective view showing another embodiment of the screen protector 1 according to the present invention.

FIG. 9 is an exploded perspective view of another embodiment of the screen protector 1 of the present invention. The difference in FIG. 9 is that the first attaching member 20 is a substantially rectangular ring-shaped sheet having a main opening 25 for embedding the grating sheet 10'''' so that the outer periphery of the grating sheet 10'''' includes a top edge 11'''', a bottom edge 12'''', and two side edges 13A''''/13B'''' which are aligned with and adjacent to the inner periphery of the main opening 25 of the first attaching member 20 includes four inner edges 251/252/253/254. In this way, if the periphery of the display screen of the electronic device is provided with the attaching bodies, the screen protector 1 in FIG. 9 can be correspondingly adsorbed by the rectangular ring-shaped first attaching member 20 thereof, and the rectangular ring-shaped first attaching member 20 matches the grating sheet 10 of corresponding size and shape, and can be implemented in the screen protector 1 of FIGS. 1, 2A and 3A instead of corresponding members, which is implemented in common with different technical solutions in the respective figures. The technical solution of FIG. 3B is adjusted and can be applied to the embodiment of FIG. 9, that is, for the case where no attaching body is disposed outside the display screen of the electronic device. The screen protector 1 in FIG. 9 can further include a separate attaching body 3T in FIG. 3B that is a rectangular ring-shaped sheet attached outside the display screen of the electronic device and corresponding to the shape and size of the attaching member 20 in FIG. 9 to be adsorbed to each other. Similarly, the technical solution of FIG. 3C is adjusted and can be applied to the embodiment of FIG. 9, that is, for the case where no attaching body is disposed outside the display screen of the electronic device. The screen protector 1 in FIG. 9 can further include one or more separate attaching bodies 3T' in FIG. 3C attached outside each side of the display screen of the electronic device and correspondingly adsorbed to the attaching member in FIG. 9.

Figure 10A:
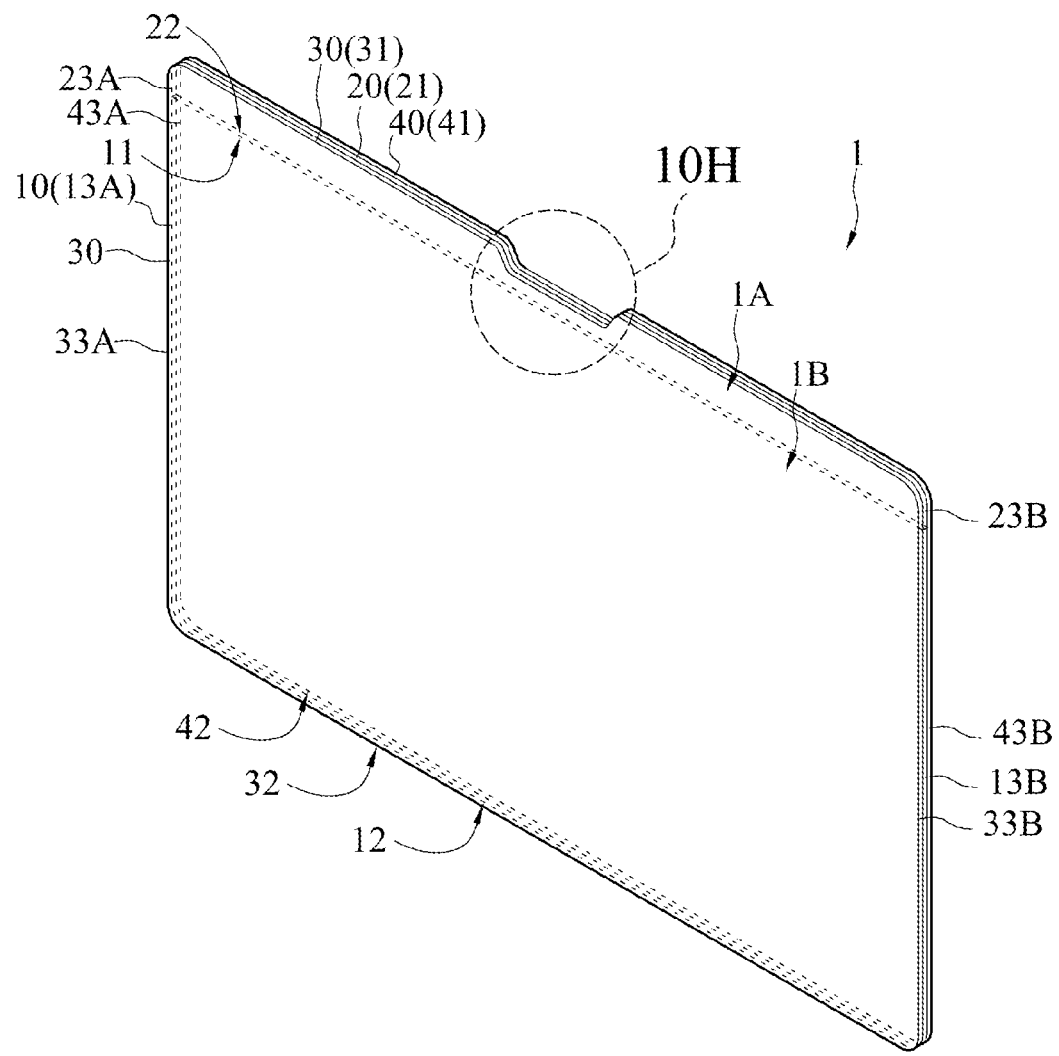
FIG. 10A is a perspective view showing another embodiment of the screen protector 1 according to the present invention.
Figure 10B:
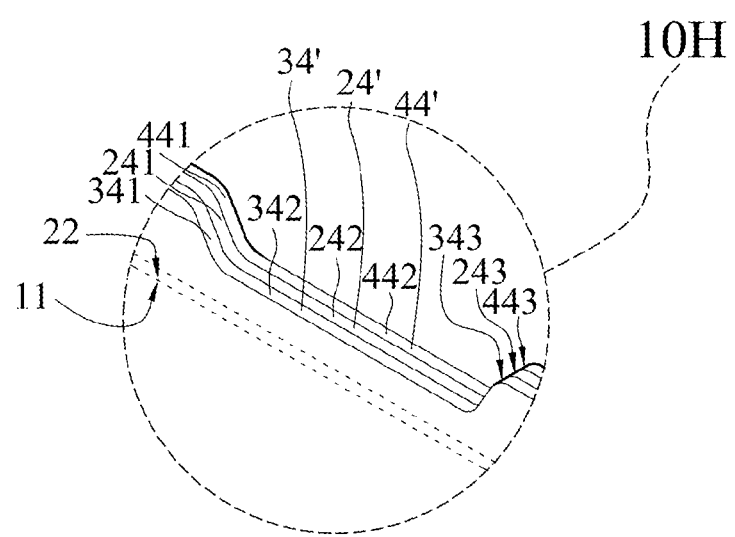
FIG. 10B is a partial enlarged view showing a region 10H in FIG. 10A.
Figure 10C:
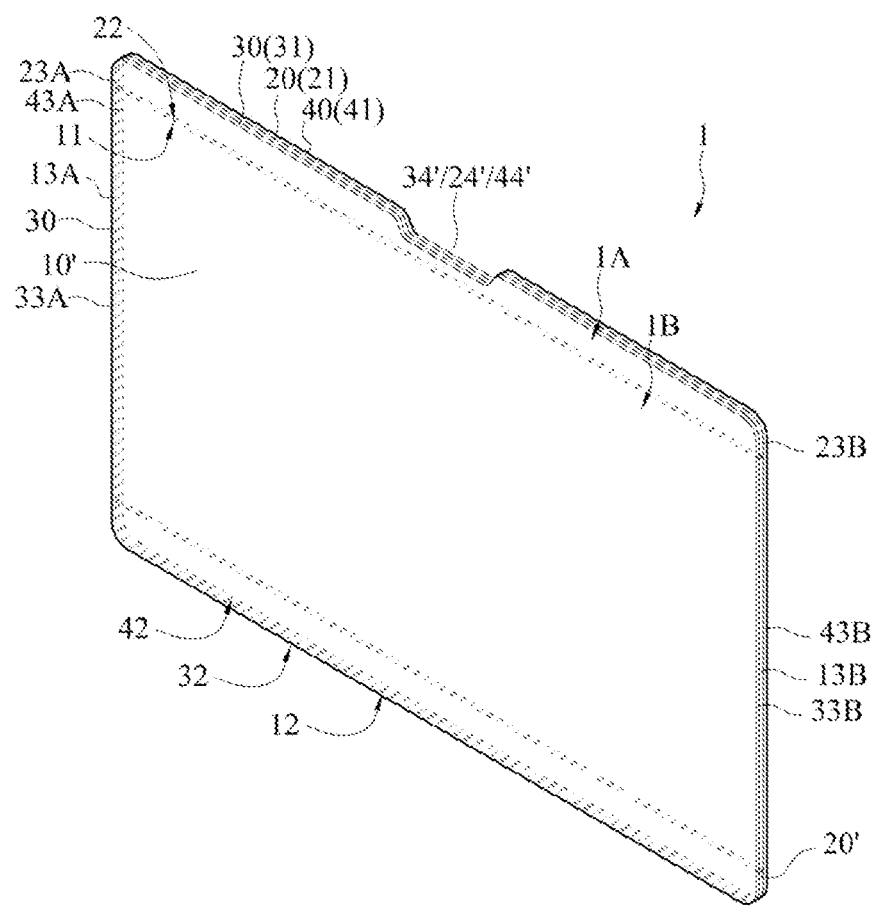
FIG. 10C is a perspective view showing application of a solution of an opening 34'/24'/44' in FIG. 10A/10B to the embodiment of the screen protector 1 of FIG. 6 according to the present invention.
Figure 10D:
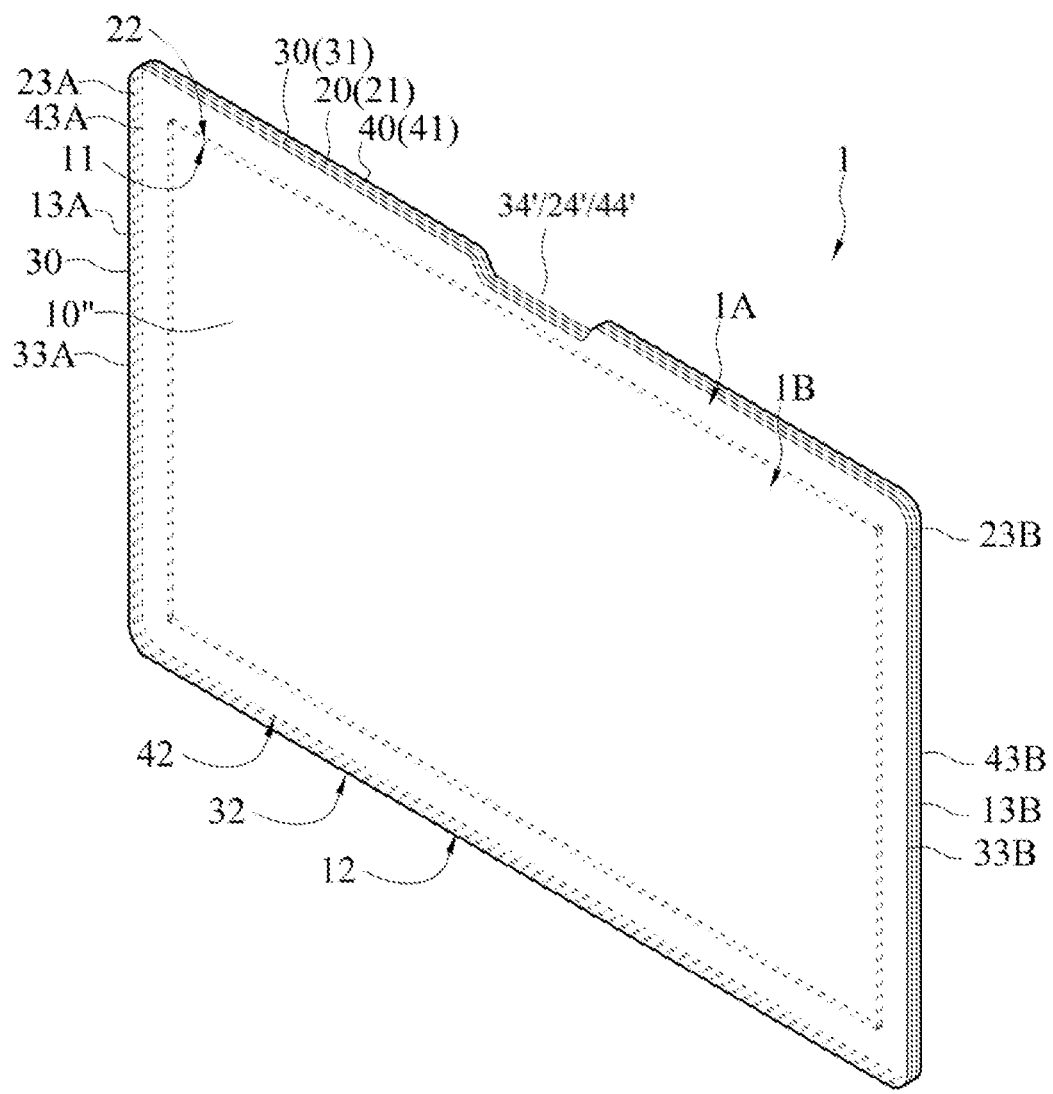
FIG. 10D is a perspective view showing application of the solution of an opening 34'/24'/44' in FIG. 10A/10B to the embodiment of the screen protector 1 of FIG. 9 according to the present application.
Figure 10E:
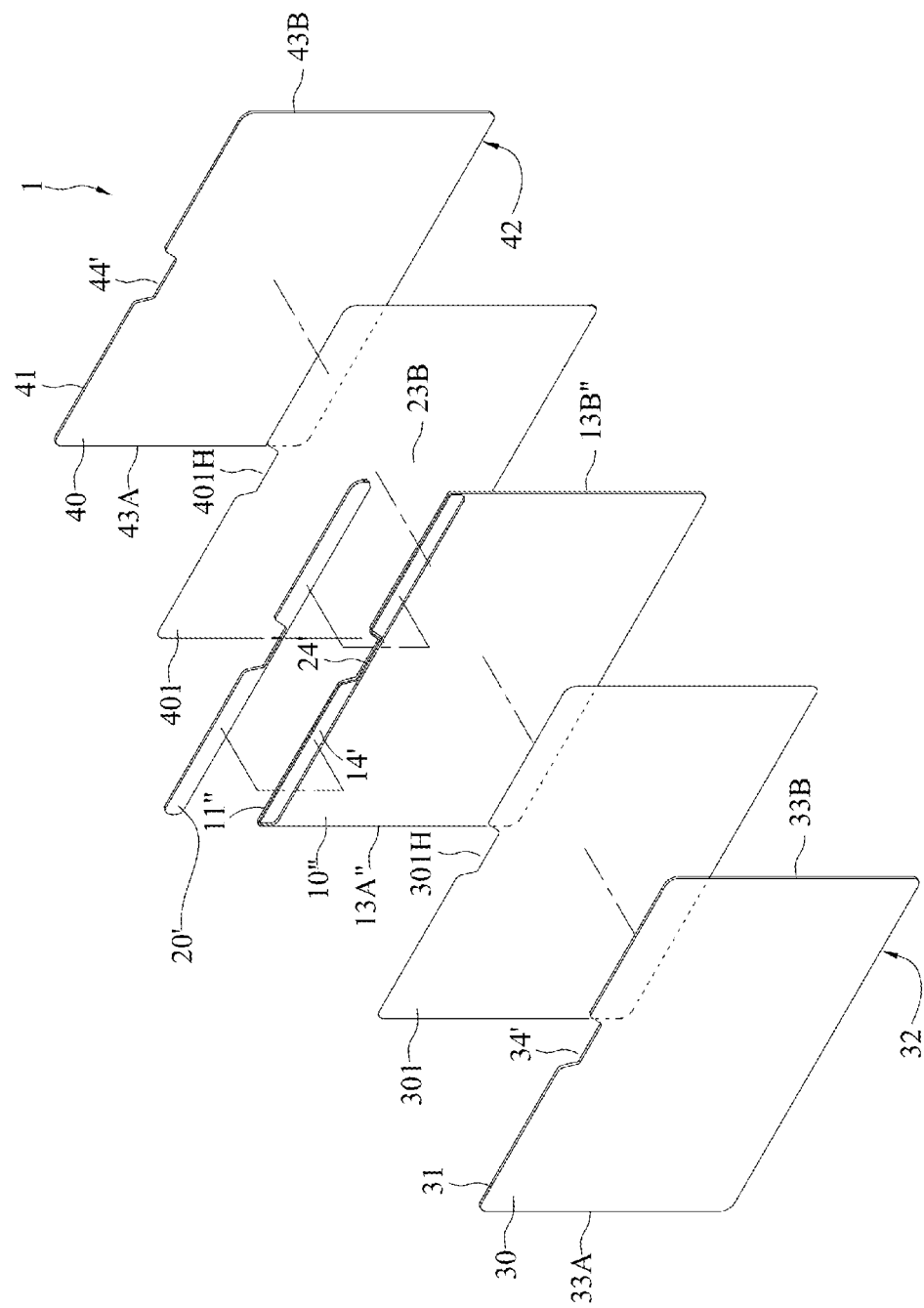
FIG. 10E is a perspective view showing application of the solution of an opening 34'/24'/44' in FIG. 10A/10B to the embodiment of the screen protector 1 of FIG. 7A according to the present application.

Referring to FIGS. 10A and 10B, FIG. 10A is a perspective view of another embodiment of the screen protector 1 of the present invention, and FIG. 10B is a partial enlarged view of a region 10H of FIG. 10A. The difference between this embodiment and the embodiment of FIGS. 2A/2B is that the opening 34', the opening 24' and the opening 44' are respectively notches that are open on one side and defined by inner edges 341/342/343, inner edges 241/242/243 and inner edge 441/442/443 of three sides. The opening 34', the opening 24' and the opening 44' correspond to each other in sizes, shapes, and positions, and can be substantially trapezoidal or rectangular. The opening 34', the opening 24' and the opening 44' in FIGS. 10A and 10B can be implemented in the screen protector 1 of FIGS. 1, 2A/2B, 3A, and 6/9 instead of corresponding members, which is implemented in common with different technical solutions in the respective figures. When applied to FIGS. 6/9, the openings 301H and 401H (not shown) of the first adhesive layer 301 and the second adhesive layer 401 correspond to the openings 34'/44' of the first outer cover film 30 and the second outer cover film 40, and the opening 24' of the attaching member 20 in sizes, shapes and positions. Similar to the opening 34', the opening 24' and the opening 44', in this example, the openings 301H and 401H are also rectangular or trapezoidal notches that are open at one side and defined by inner edges of three sides, as shown in FIG. 10C (applying the opening 34'/24'/44' in FIG. 10A/10B to the embodiment of FIG. 6) and FIG. 8D (applying the solution of the opening 34'/24'/44' in FIGS. 10A/10B to the embodiment of FIG. 9). The technical solution of FIG. 3B is adjusted and can be applied to the embodiments of FIGS. 10A/10B, that is, for the case where no attaching body is disposed outside the display screen of the electronic device. The screen protector 1 in FIGS. 10A/10B can further include a separate attaching body 3T in FIG. 3B that is attached to the top side of the display screen of the electronic device and corresponding to the shape and size of the attaching member 20 in FIGS. 10A/10B (strip-shaped and extending in the long side of the grating sheet 10, and the opening 3T0 is changed into a notch in FIGS. 10A/10B) to be adsorbed to each other. Similarly, the technical solution of FIG. 3C is adjusted and can be applied to the embodiment of FIGS. 10A/10B, that is, for the case where no attaching body is disposed outside the display screen of the electronic device. The screen protector 1 in FIGS. 10A/10B can further include one or more separate attaching bodies 3T' in FIG. 3C attached to the top side of the display screen of the electronic device and correspondingly adsorbed to the attaching member 20 in FIGS. 10A/10B. The technical solution of FIG. 7A is adjusted for adapting the embodiment of FIG. 10A. Referring to FIG. 10E, a receiving groove 14' is formed on the grating sheet 10" near a top edge 11". The receiving groove 14' has two wide portions having a larger width and a neck portion having a smaller width. The neck portion is located between the wide portions and connects the wide portions. The first attaching member 20' has a shape corresponding to the shape of the receiving groove 14' such that a surface of the first attaching member 20' is aligned with a surface of the grating sheet 10" when the first attaching member 20' is received in and fitted to the receiving groove 14'.

Figure 11A:
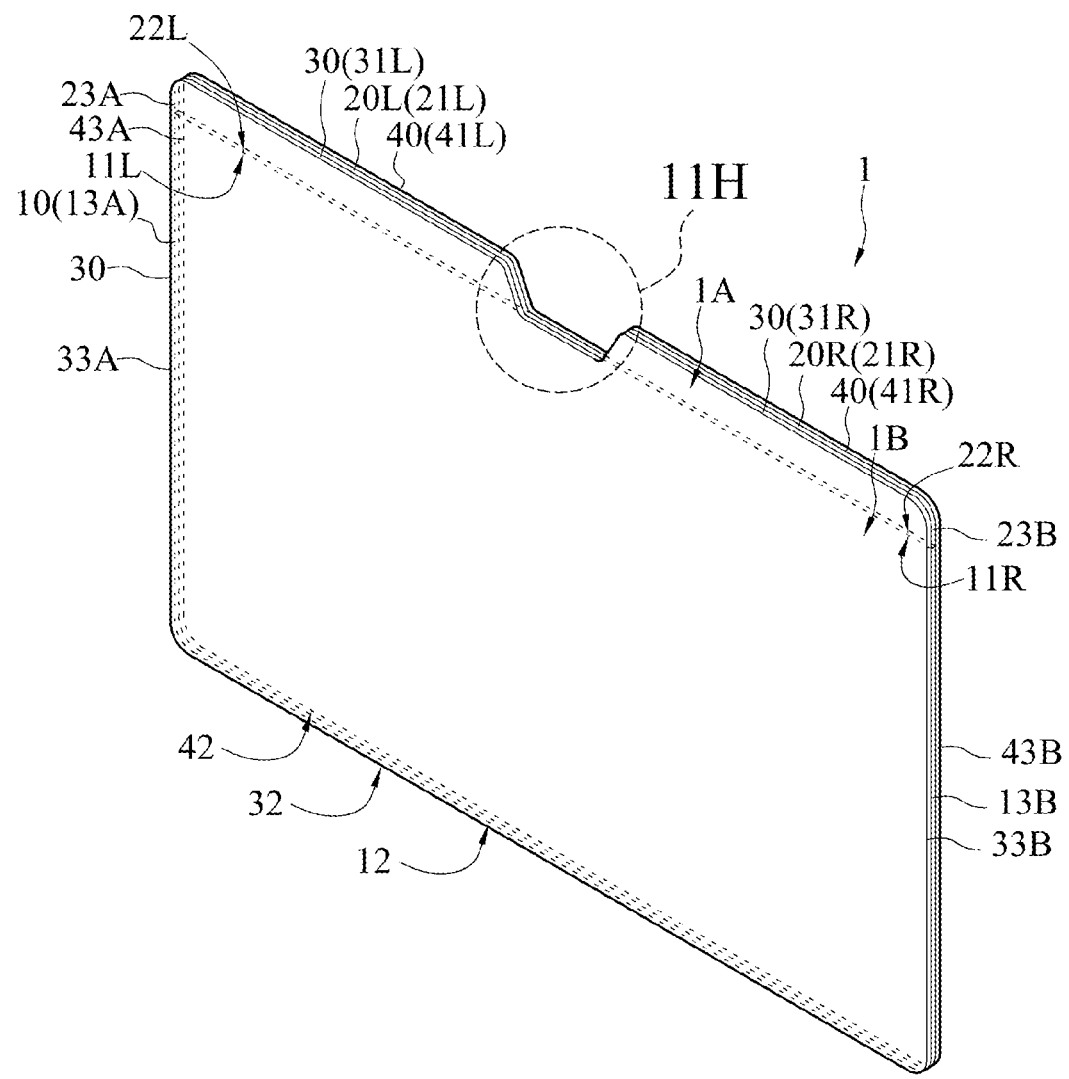
FIG. 11A is a perspective view showing another embodiment of the screen protector 1 according to the present invention.
Figure 11B:
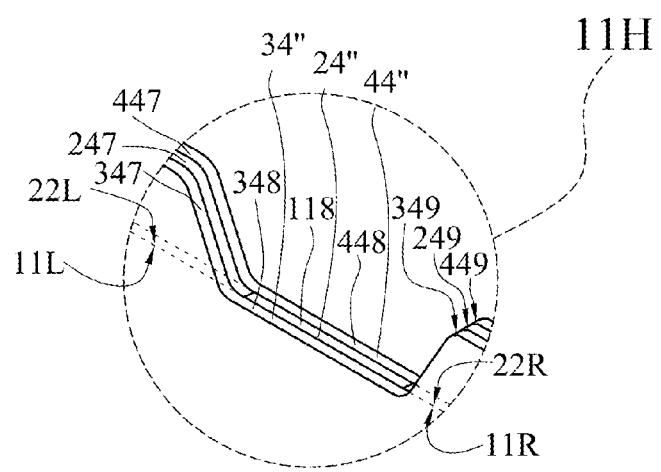
FIG. 11B is a partial enlarged view showing a region 11H in FIG. 11A.
Figure 11C:
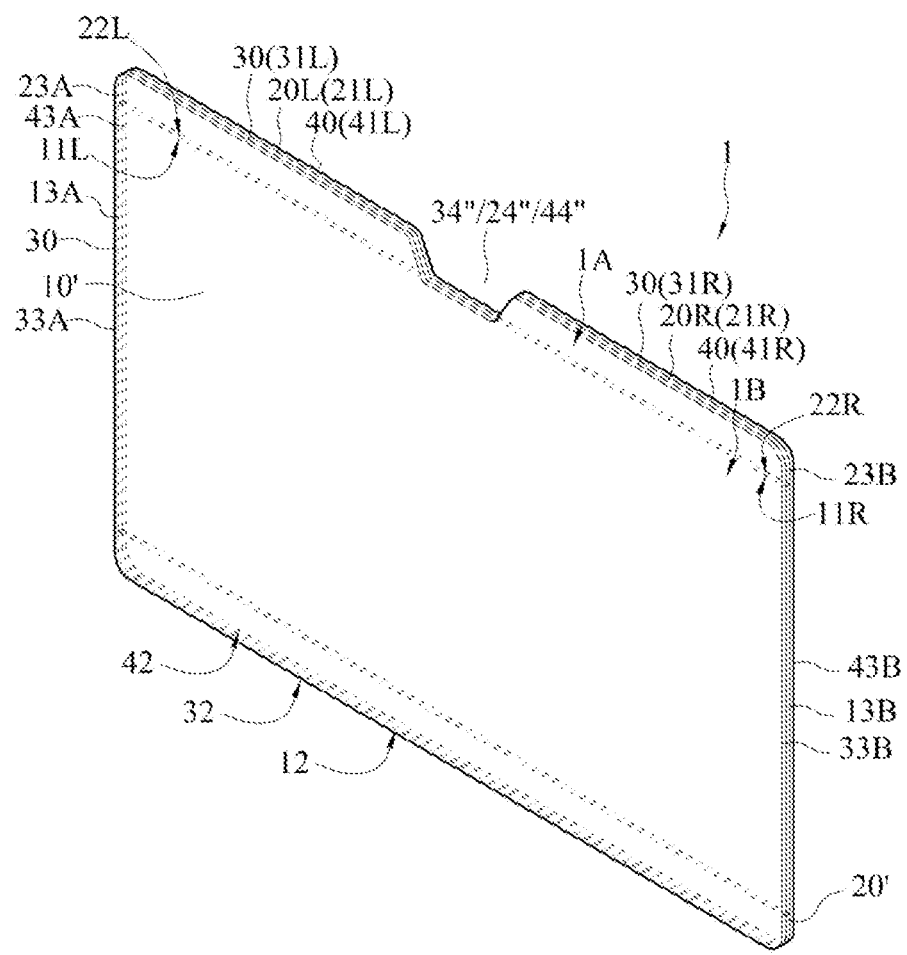
FIG. 11C is a perspective view showing application of a solution of an opening 34"/44" and a gap 24" in FIG. 11A/11B to the embodiment of the screen protector 1 of FIG. 6 according to the present invention.
Figure 11D:
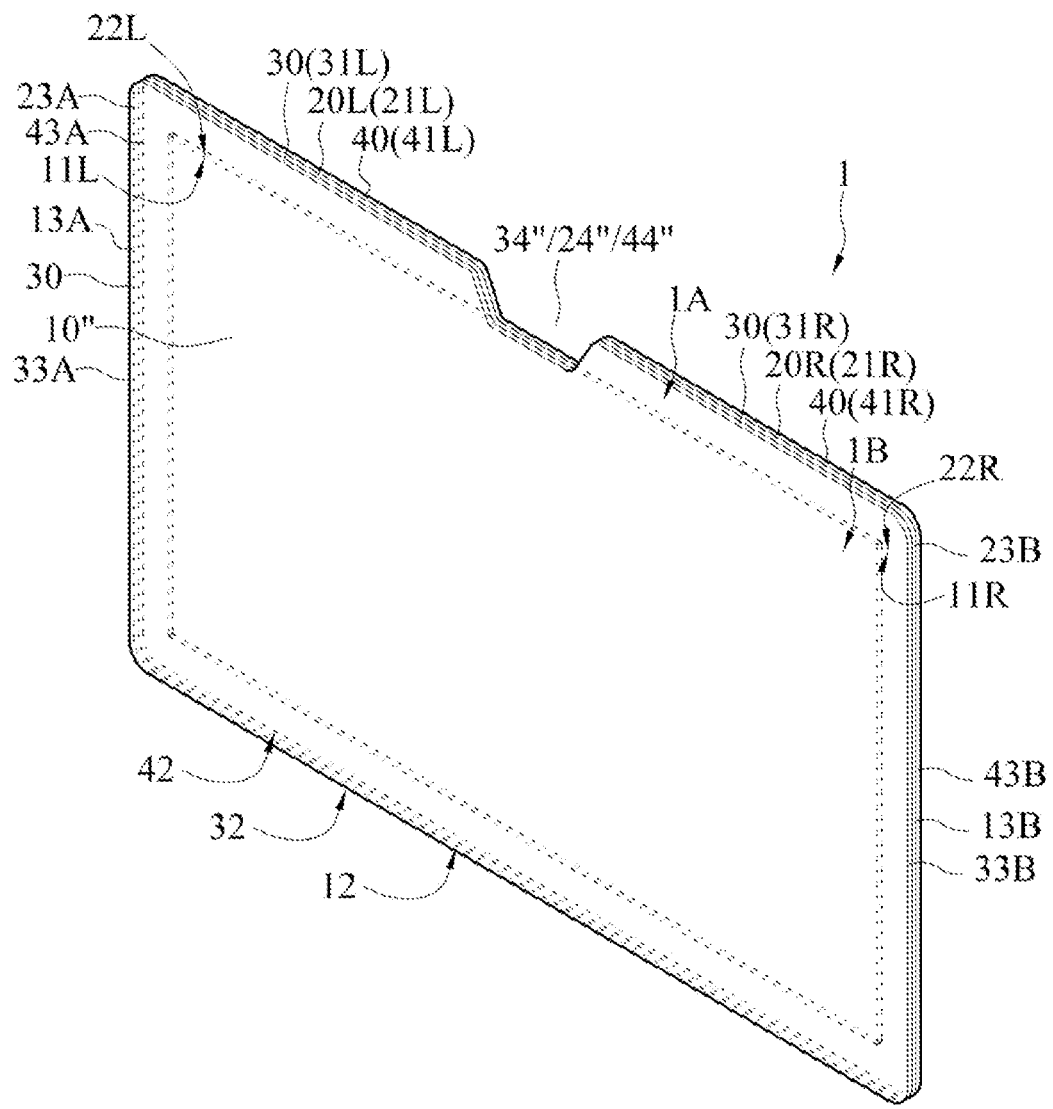
FIG. 11D is a perspective view showing application of a solution of the opening 34"/44" and the gap 24" in FIG. 11A/11B to the embodiment of the screen protector 1 of FIG. 9 according to the present invention.
Figure 11E:
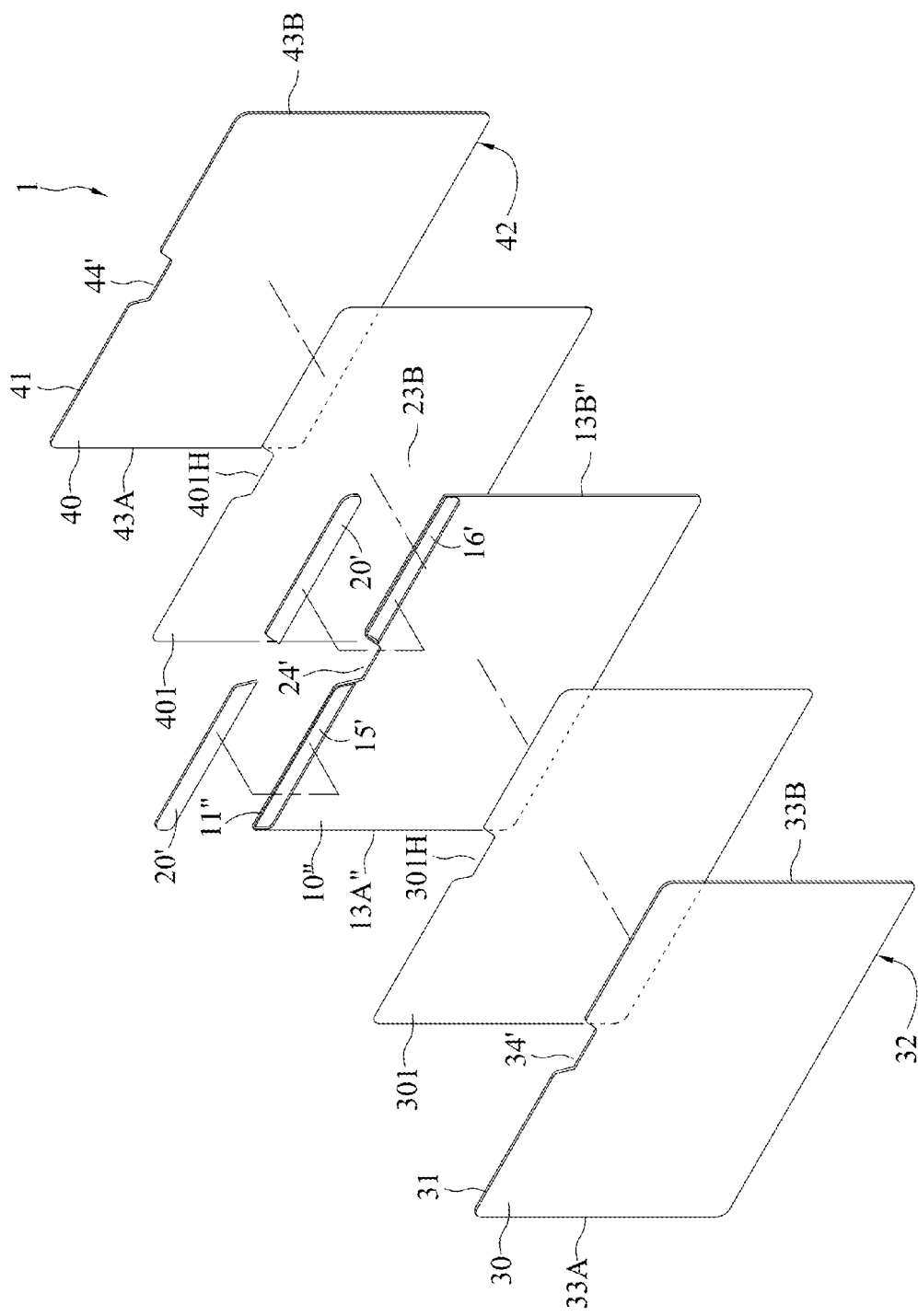
FIG. 11E is a perspective view showing application of a solution of the opening 34'/24'/44' in FIG. 10A/10B to the embodiment of the screen protector 1 of FIG. 8 according to the present invention.

Referring to FIGS. 11A and 11B, FIG. 11A is a perspective view of another embodiment of the screen protector 1 of the present invention, and FIG. 11B is a partial enlarged view of a region 11H of FIG. 11A, and both FIGS. 11A and 11B omit the first adhesive layer 301 and the second adhesive layer 401. The difference between this embodiment and the embodiments of FIGS. 10A/10B is that the original integrated first attaching member 20 is separated by a gap 24" into two half-attaching members 20L/20R, which are defined between the left half-attaching member 20L and the right half-attaching member 20R, so that the half-attaching members 20L and 20R are completely disconnected, disposed at the left and right sides and aligned with each other. The vertical depth of the gap 24" is equal to the short side lengths of the half-attaching members 20L and 20R, and the long side lengths of the half-attaching members 20L and 20R are less than half the long side length of the grating sheet 10. The first outer cover film 30 and the second outer cover film 40 respectively have openings 34"/44" which respectively correspond to the gaps 24" in sizes, shapes and positions and can be substantially trapezoidal or rectangular. The openings 34"/44" are open on one side and are defined by inner edges 347/348/349 and inner edges 447/448/449 of three sides, respectively. The gap 24" between the half-attaching member 20L and the half-attaching member 20R is defined by the side edge 247 of the half-attaching member 20L, the side edge 249 of the half-attaching member 20R, and the middle top edge 118 of the grating sheet 10. The half-attaching member 20L and the half-attaching member 20R are respectively disposed vertically adjacent to the grating sheet 10 side-by-side; that is, the bottom edge 22L of the half-attaching member 20L is vertically aligned with and adjacent to the left top edge 11L of the grating sheet 10, and both may be adhesively fixed or merely adjacent to each other; and the bottom edge 22R of the half-attaching member 20R is aligned with and adjacent to the right top edge 11R of the grating sheet 10, and both may be adhesively fixed or merely adjacent to each other. The left top edge 31L of the first outer cover film 30, the top edge 21L of the half-attaching member 20L, and the left top edge 41L of the second outer cover film 40 are sequentially aligned horizontally, respectively. Similarly, the right top edge 31R of the first outer cover film 30, the top edge 21R of the half-attaching member 20R, and the right top edge 41R of the second outer cover film 40 are sequentially aligned horizontally, respectively. The technical solution of FIG. 8 is adjusted for adapting the embodiment of FIG. 11A. Referring to FIG. 11E, a first receiving groove 15' and a second receiving groove 16' is formed on the grating sheet 10" near the top edge 11". The opening 24' is formed between the first receiving groove 15' and the second receiving groove 16'. The shape of the half-attaching member 20' corresponds to the shape of the first receiving groove 15' and the second receiving groove 16' and fitted to the first receiving groove 15' and the second receiving groove 16' respectively such that a surface of the first attaching member is aligned with a surface of the grating sheet 10" when the half-attaching members 20' are received in and fitted to the first receiving groove 15' and the second receiving groove 16' respectively.

The technical solutions of the half-attaching member 20L and the half-attaching member 20R that are completely disconnected and disposed at the left and right sides, the opening 34" of the first outer cover film 30/the gap 24"/the opening 44" of the second outer cover film 40 in FIGS. 11A and 11B can be applied to the screen protector 1 of FIGS. 1, 2A/2B, 3A, and 5/6/7A/8/9. When the technical solutions in FIGS. 11A and 11B are applied to FIGS. 1, 2A/2B, 3A, and 5/6/7A/8/9, the openings 301H and 401H (not shown) of the first adhesive layer 301 and the second adhesive layer 401 correspond to the openings 34"/44" of the first outer cover film 30 and the second outer cover film 40, and the gap 24" between the half-attaching member 20L and the half-attaching member 20R in sizes, shapes and positions. When the technical solutions in FIGS. 11A and 11B are applied to FIGS. 5/6, the openings 301H and 401H in FIGS. 5/6 are similar to the openings 34", the openings 24" and the openings 44" in FIGS. 11A and 11B, that is, the openings 301H and 401H in FIGS. 5/6 are also rectangular or trapezoidal notches that are open at one side and defined by inner edges of three sides, respectively, as shown in FIG. 11C. When the technical solutions in FIGS. 11A and 11B are applied to FIG. 9, two half-attaching members 20L/20R are annularly connected along the outer periphery of the grating sheet 10"' to form a ring shape, and are formed with a main opening 25 for embedding the grating sheet 10"', so that the outer periphery of the grating sheet 10"' is adjacent to the inner periphery of the main openings 20 of the two half-attaching members 20L/20R, as shown in FIG. 11D.

Figure 12A:
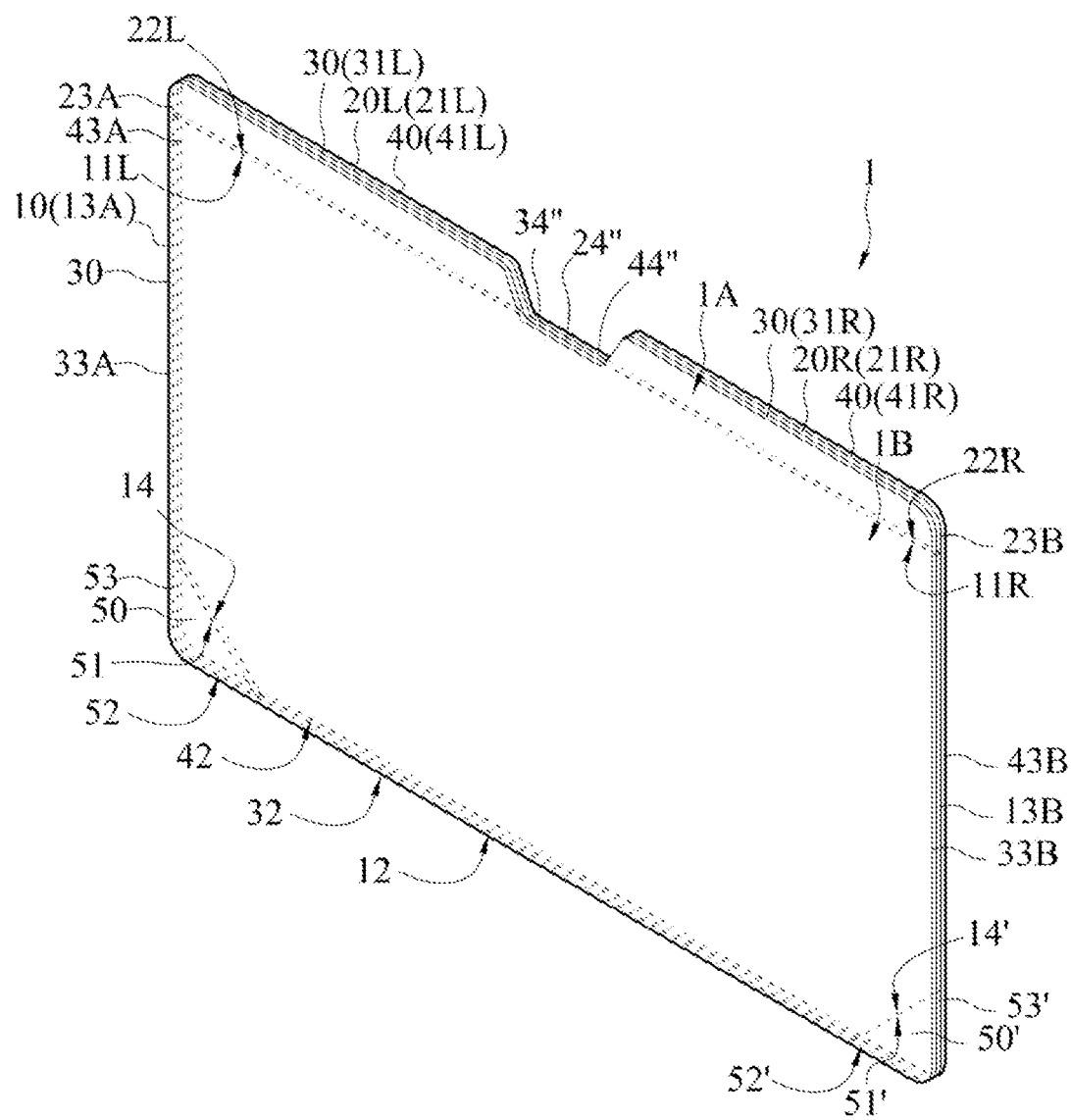
FIG. 12A is a perspective view showing another embodiment of the screen protector 1 according to the present invention.

FIG. 12A is a perspective view showing another embodiment of the screen protector 1 according to the present invention. The main difference between FIGS. 12A and 11A is that one or more corners of the bottom edge 12 of the grating sheet 10 of the screen protector 1 in FIG. 12A are truncated and retracted into one or two truncated sides 14/14' (which are linear and located at opposite sides of the two half-attaching members 20L/20R in FIG. 12A), and the screen protector 1 further includes one or more third attaching members 50/50' respectively aligned with the grating sheet 10 and adjacently disposed outside the truncated sides 14/14' of the grating sheet 10. The third attaching member 50 has an inner side 51 (which is linear in FIG. 12A), and a bottom side 52 and a vertical side 53 which are respectively connected to two outer ends of the inner side 51 and are substantially perpendicular to each other (so that the third attaching member 50 is substantially triangular). The third attaching member 50' has an inner side 51' (which is linear in FIG. 12A), and a bottom side 52' and a vertical side 53' which are respectively connected to two outer ends of the inner side 51' and are substantially perpendicular to each other (so that the third attaching member 50' is substantially triangular). Moreover, the truncated side 14 of the grating sheet 10 is aligned with and adjacent to the inner side 51 of the third attaching members 50, and both may be adhesively fixed or merely adjacent to each other; and the truncated side 14' of the grating sheet 10 is aligned with and adjacent to the inner side 51' of the third attaching member 50', and both may be adhesively fixed or merely adjacent to each other. The third attaching members 50/50' are respectively adhered to two bottom corners between the first outer cover film 30 and the second outer cover film 40 in FIG. 12A. In FIG. 12A, the lower sections of two side sides 33A/33B of the first outer cover film 30, the vertical sides 53/53' of the third attaching members 50/50' and the lower sections of two side edges 43A/43B of the second outer cover film 40 are sequentially aligned horizontally, respectively. Similarly, two outer sections of the bottom edge 32 of the first outer cover film 30, the bottom side 52/52' of the third attaching member 50/51' and two outer sections of the bottom edge 42 of the second outer cover film 40 are sequentially aligned horizontally, respectively.

Although the two half-attaching members 20L/20R, the grating sheet 10, and the third attaching members 50/50' are independent members, they are simultaneously adhered between the first outer cover film 30 and the second outer cover film 40 to maintain a certain structural strength, so that the screen protector 1 can maintain a flat surface and would not warp. The effect that the third attaching members 50/50' prevent the screen protector 1 from warping is particularly prominent in the implementation of a large-sized screen protector 1 (for example, the diagonal is more than 20 inches). Certainly, if the display screen 4 of the electronic device 2 is provided with an attaching body 3 at the corner of the bottom side, the third attaching members 50/50' are the attaching body 3 correspondingly adsorbed at the corner of the bottom side of the display screen 4 of the electronic device 2.

Figure 12B:
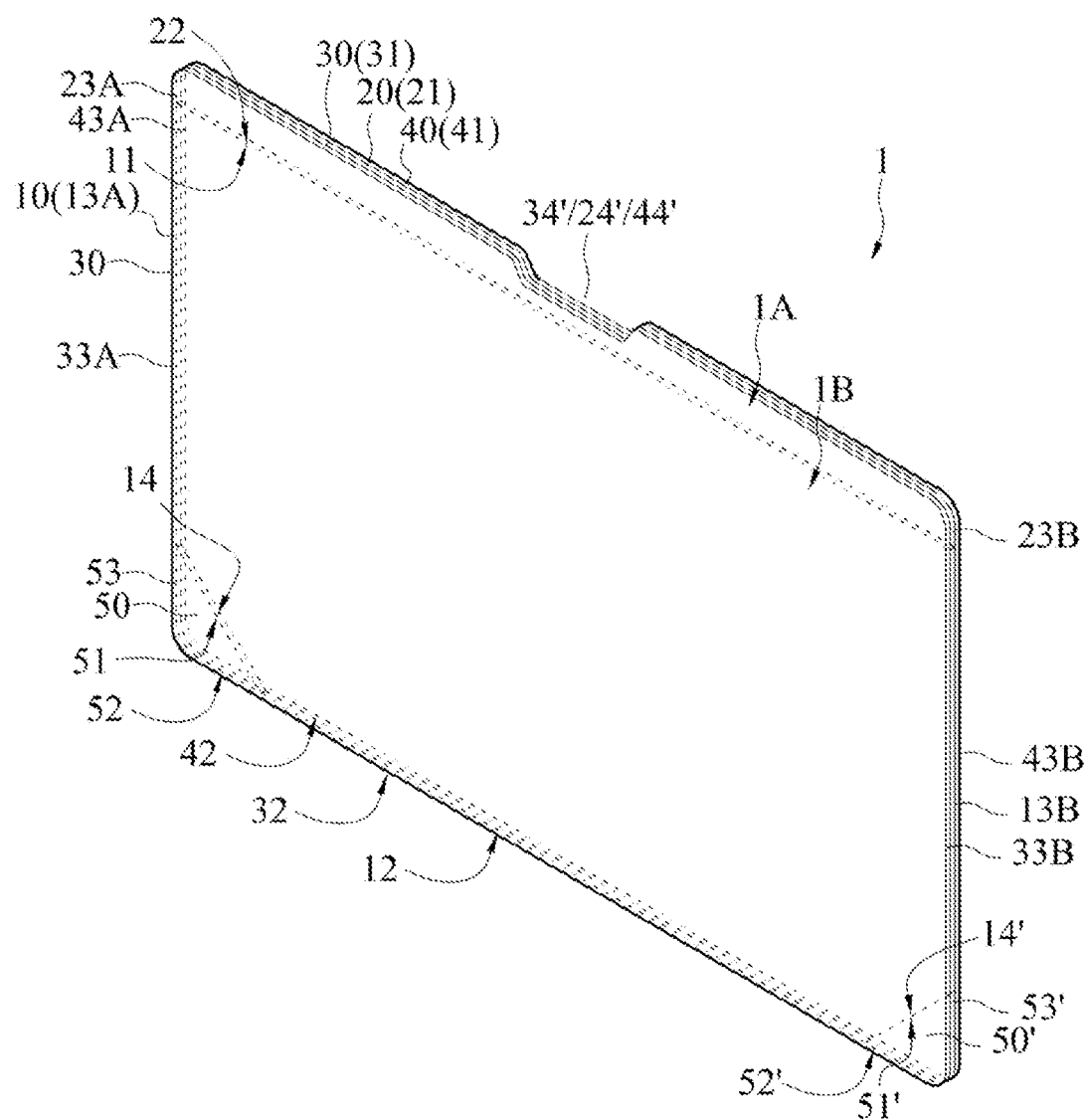
FIG. 12B is a perspective view showing another embodiment of the screen protector 1 according to the present invention.

The technical solution that the grating sheet 10 having retracted truncated sides 14/14' matches the third attaching members 50/50' having vertical sides 53/53', bottom sides 52/52' and inner sides 51/51' in FIG. 12A can be implemented in the screen protector 1 in FIGS. 1, 2A/2B, 3A and 5/10A/11A instead of the corresponding members, which is implemented in common with different technical solutions in the respective figures, as applied to the embodiment of FIG. 10A, as shown in FIG. 12B.

Figure 13A:
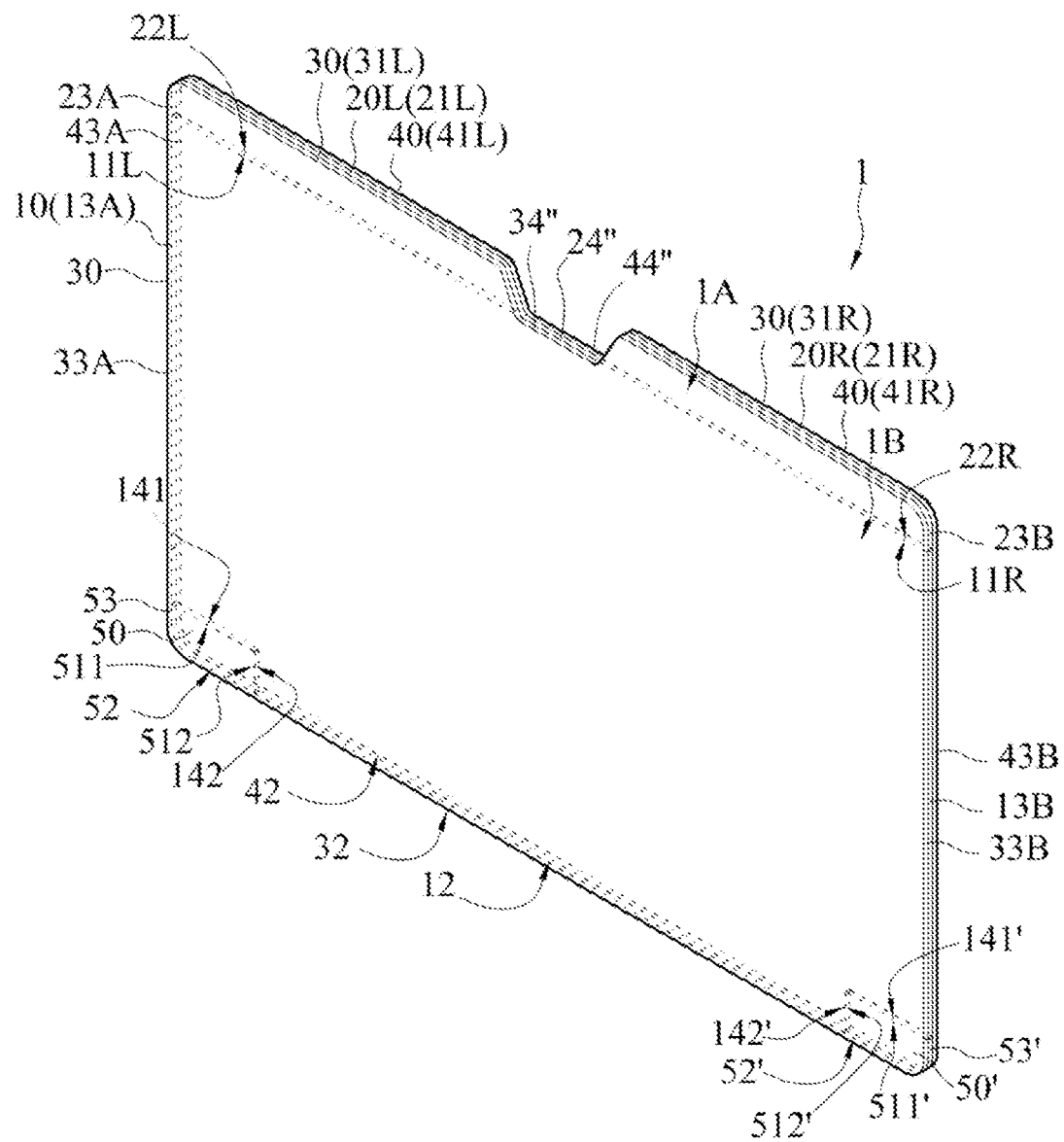
FIG. 13A is a perspective view showing another embodiment of the screen protector 1 according to the present invention.

FIG. 13A is a perspective view showing another embodiment of the screen protector 1 according to the present invention. The main difference between FIGS. 13A and 12A is that the third attaching members 50/50' are substantially L-shaped sheets as a whole. Specifically, one or more corners of the bottom edge 12 of the grating sheet 10 of the screen protector 1 in FIG. 13A are notched to form one or more pairs of truncated sides 141/142 and/or 141'/142' which are approximately perpendicular to each other (inverted L-shaped in FIG. 13A), and the screen protector 1 further includes one or more third attaching members 50/50' respectively aligned with the grating sheet 10 and adjacently disposed outside the pair of truncated sides 141/142 and/or 141'/142' of the grating sheet 10. The third attaching member 50 has a pair of inner sides 511/512 (which are inverted L-shaped in FIG. 12A), and the bottom side 52 and the vertical side 53 which are respectively connected to two outer ends of the pair of inner sides 511/512 and are substantially perpendicular to each other (so that the third attaching member 50 is substantially rectangular). The third attaching member 50' has a pair of inner sides 511'/512' (which are inverted L-shaped in FIG. 12A), and the bottom side 52' and the vertical side 53' which are respectively connected to two outer ends of the inner sides 511'/512' and are substantially perpendicular to each other (so that the third attaching member 50' is substantially rectangular). Moreover, the pair of truncated sides 141/142 of the grating sheet 10 are respectively aligned with and adjacent to the pair of inner sides 511/512 of the third attaching members 50, and both may be adhesively fixed or merely adjacent to each other; and the truncated side 141'/142' of the grating sheet 10 are respectively aligned with and adjacent to the pair of inner side 511'/512' of the third attaching member 50', and both may be adhesively fixed or merely adjacent to each other.

Figure 13B:
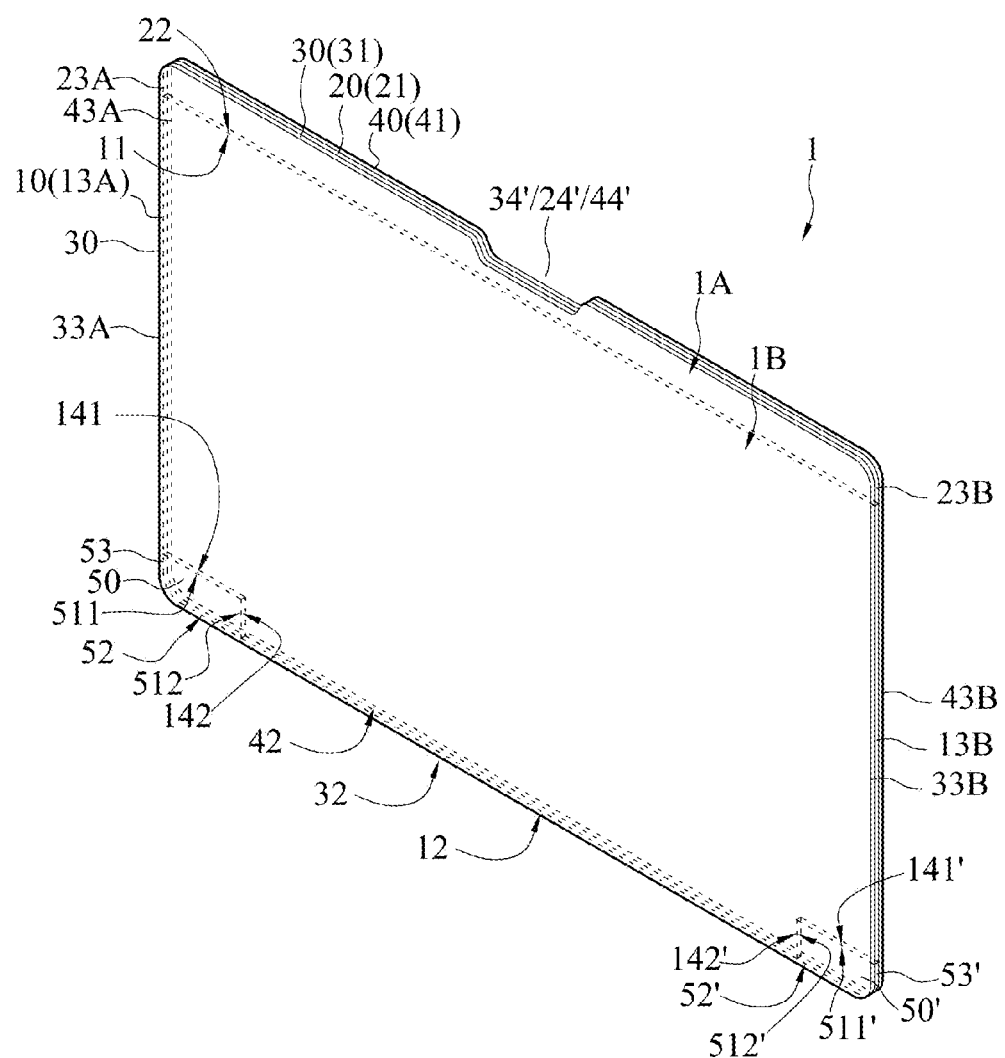
FIG. 13B is a perspective view showing another embodiment of the screen protector 1 according to the present invention.

The technical solution that the grating sheet 10 having a pair of truncated sides 141/142 and 141'/142' notched at the bottom side matches the third attaching members 50/50' having the vertical sides 53/53', the bottom sides 52/52' and a pair of inner sides 511/512 and 511'/512' in FIG. 13A can be implemented in the screen protector 1 in FIGS. 1, 2A/2B, 3A and 5/6/8/9/10A/11A/12A instead of the corresponding members, which is implemented in common with different technical solutions in the respective figures, as FIG. 13A is applied to the embodiment of FIG. 10A, as shown in FIG. 13B. Although the third attaching members 50/50' of FIGS. 12A/13A are right-triangular or L-shaped, in different embodiments, the third attaching members 50/50' can also be rectangles or other polygons having different aspect ratios.

Figure 14A:
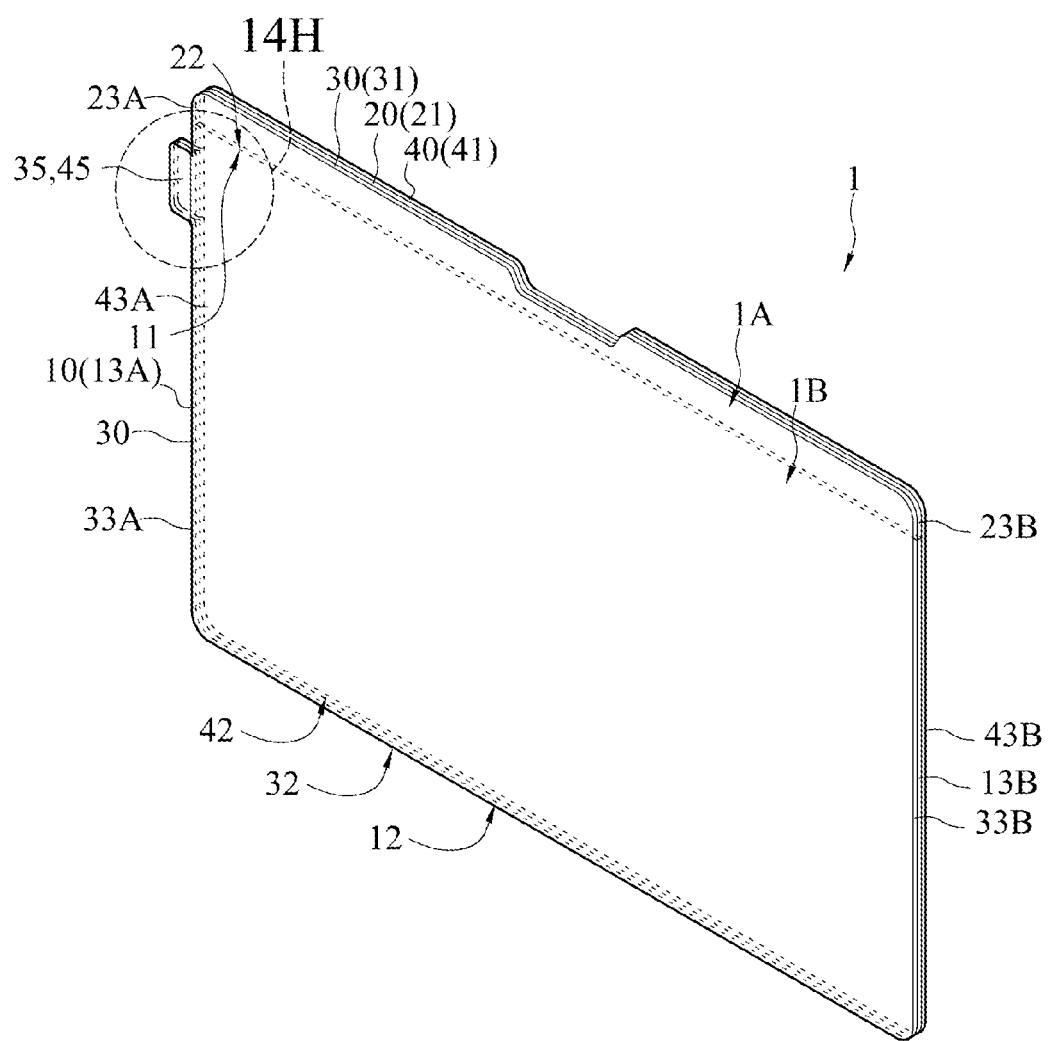
FIG. 14A is a perspective view showing another embodiment of the screen protector 1 according to the present invention.
Figure 14B:
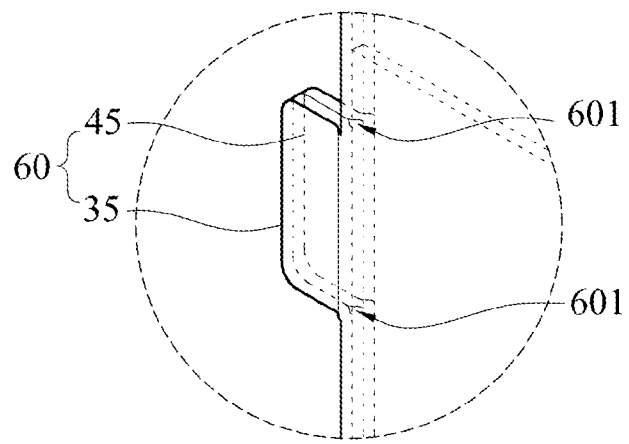
FIG. 14B is a partial enlarged view showing a region 14H in FIG. 14A.
Figure 14C:
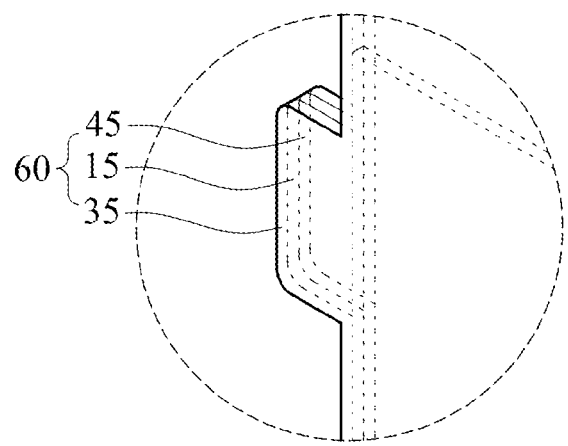
FIG. 14C is a partially enlarged perspective view showing another embodiment of the screen protector 1 according to the present invention.

Referring to FIGS. 14A and 14B, FIG. 14A is a perspective view of another embodiment of the screen protector 1 of the present invention, and FIG. 14B is a partial enlarged view of a region 14H of FIG. 14A. The difference between this embodiment and the embodiments of FIGS. 10A/10B is that the screen protector 1 has a tab 60 which may be in the shape of a rectangle, a trapezoid or a polygon of other types. In FIGS. 14A and 14B, the tab 60 can be formed by pressing and laminating lugs 35/45 which extend from the first outer cover film 30 and the second outer cover film 40 and is located outside the grating sheet 10. Since the grating sheet 10 does not extend outward, a gap is formed when the lugs 35/45 of the first outer cover film 30 and the second outer cover film 40 are laminated to form the tab 60, and a sealant 601 (for example, the OCA) can be filled. FIG. 14C is a partially enlarged perspective view showing another embodiment of the screen protector according to the present invention. In FIG. 14C, the tab 60 is formed by pressing and laminating the lugs 35/45 which extend from the first outer cover film 30 and the second outer cover film 40, and the lug 15 which extends from the grating sheet 10. In addition, in different embodiments, the tab 60 can be disposed on either side of the outer side of the grating sheet 10 and can be disposed on either side of the outer side of the attaching member 20 or located at either side of the outer side of a junction of the grating sheet 10 and the attaching member 20.

Figure 15A:
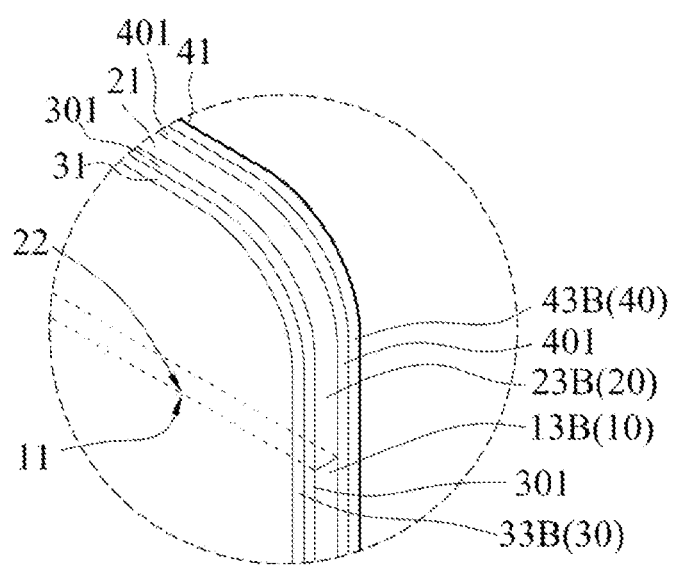
FIG. 15A is a partially enlarged perspective view showing another embodiment of the screen protector 1 according to the present invention.
Figure 15B:
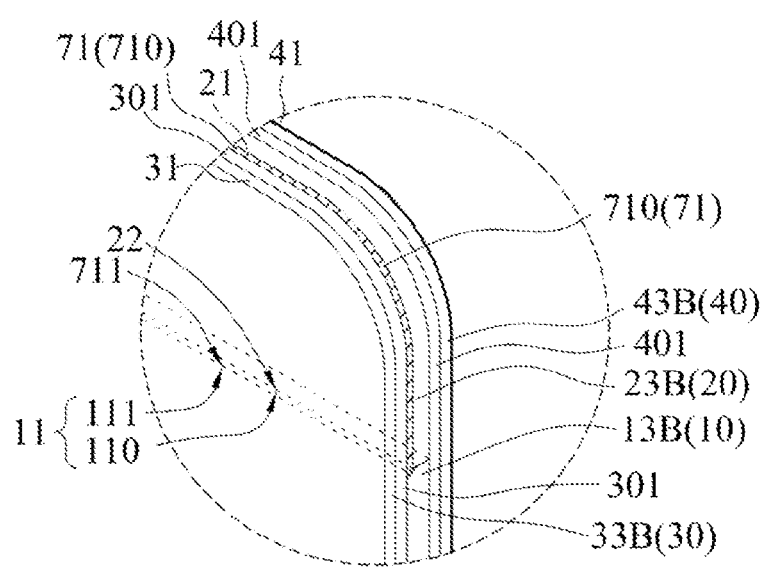
FIG. 15B is a partially enlarged perspective view showing another embodiment of the screen protector 1 according to the present invention.
Figure 15C:
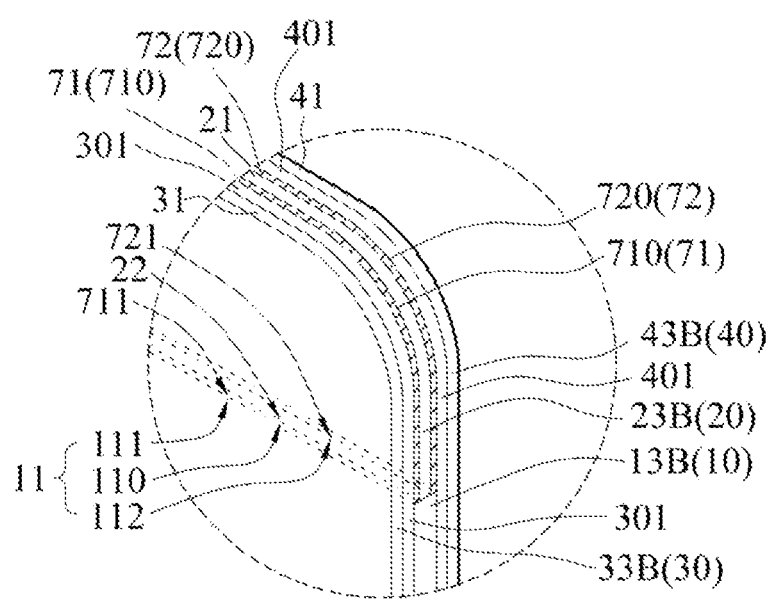
FIG. 15C is a partially enlarged perspective view showing another embodiment of the screen protector 1 according to the present invention.

Referring to FIGS. 15A/15B/15C, FIG. 15A is a partially enlarged perspective view of another embodiment of the screen protector 1 of the present invention, FIG. 15B is a partially enlarged perspective view of another embodiment of the screen protector 1 of the present invention, and FIG. 15C is a partially enlarged perspective view of another embodiment of the screen protector 1 of the present invention. FIG. 15A is a stereoscopic structure showing that the screen protector 1 is formed by sequentially laminating the outer cover film 30, the first adhesive layer 301, the attaching member 20 and the grating sheet 10 vertically adjacent to each other, the second adhesive layer 401 and he outer cover film 40, at the junction of the grating sheet 10 and the attaching member 20, which is similar to the structure disclosed in FIGS. 5 and 6. FIG. 15B shows that the screen protector 1 further includes a decorative layer 71 located between the rear side of the first adhesive layer 301 and the front side of the attaching member 20, and is similar in shape and position to the attaching member 20. The decorative layer 71 can be realized by spraying a pigment or paint or printing a pattern on the front surface of the attaching member 20 or attaching a thin film having a printed pattern to the surface of the attaching member 20 prior to processing. The decorative layer 71 has an outer periphery 710 aligned with the top edges 31/41 and the side edges 33A/33B and 43A/43B of the first outer cover film 30 and the second outer cover film 40, and the top edge 21 and the side edge 23B of the first attaching member 20. Moreover, the decorative layer 71 has a bottom edge 711 aligned with and adjacent to the front top edge 111 of the grating sheet 10, and the bottom edge 22 of the attaching member 20 is still aligned with and adjacent to the main top edge 110 of the grating sheet 10, that is, the bottom edge 711 of the decorative layer 71 and the bottom edge 22 of the attaching member 20 together are aligned with and adjacent to the top edge 11 of the grating sheet 10 (the front top edge 111 and the main top edge 110). In this way, the decorative component can also be implemented inside the screen protector 1, that is, the decorative component is in the same layer as the grating sheet 10, so that the screen protector 1 can be thinned.

FIG. 15C is different from FIG. 15B in that the screen protector 1 further includes another decorative layer 72, similar to the decorative layer 71, located between the rear surface of the first attaching member 20 and the front surface of the second adhesive layer 401. Although the visual elements such as materials, processing methods, patterns, and colors used for decoration may be different, both the decorative layer 71 and the decorative layer 72 are for decorative purposes. The decorative layer 72 has an outer periphery 720 aligned with the top edges 31/41 and the side edges 33A/33B and 43A/43B of the first outer cover film 30 and the second outer cover film 40, and the top edge 21 and the side edge 23B of the first attaching member 20. Moreover, the decorative layer 72 has a bottom edge 721 aligned with and adjacent to the rear top edge 112 of the grating sheet 10, and the bottom edge 22 of the first attaching member 20 is still aligned with and adjacent to the main top edge 110 of the grating sheet 10, that is, the bottom edge 711 of the decorative layer 71, the bottom edge 22 of the first attaching member 20 and the bottom edge 721 of the decorative layer 72 together are aligned with and adjacent to the top edge 11 of the grating sheet 10 (the front top edge 111, the main top edge 110 and the rear top edge 112). In this way, both sides of the screen protector 1 can be used as front and back sides, which is beneficial to the user's free application.

The decorative layers 71 and/or 72 in FIGS. 15B/15C is disposed on the front surface and/or the rear surface of the attaching member 20, and this solution can be implemented in the screen protector 1 in FIGS. 1, 2A/2B, 3A, 5/6/7/8/9, 10A/10B, 11A/11B, 12A/12B/13A/13B, and 14A/14B/14C instead of corresponding members, which is implemented in common with different technical solutions in the respective figures. For example, the decorative layers 71 and/or 72 can also be disposed on the front surface and/or the rear surface of the first attaching member, the second attaching member, and/or the third attaching member. In FIGS. 15B and 15C, the decorative layers 71/72 are disposed on the front surface/rear surface of the first absorbing member 20, and in other embodiments, the decorative layers 71/72 can also be respectively disposed on the front surface and/or the rear surface of the first outer cover film 30 and the second outer cover film 40, and have the sizes, shapes and positions substantially corresponding to the attaching member 20.

Figure 16A:
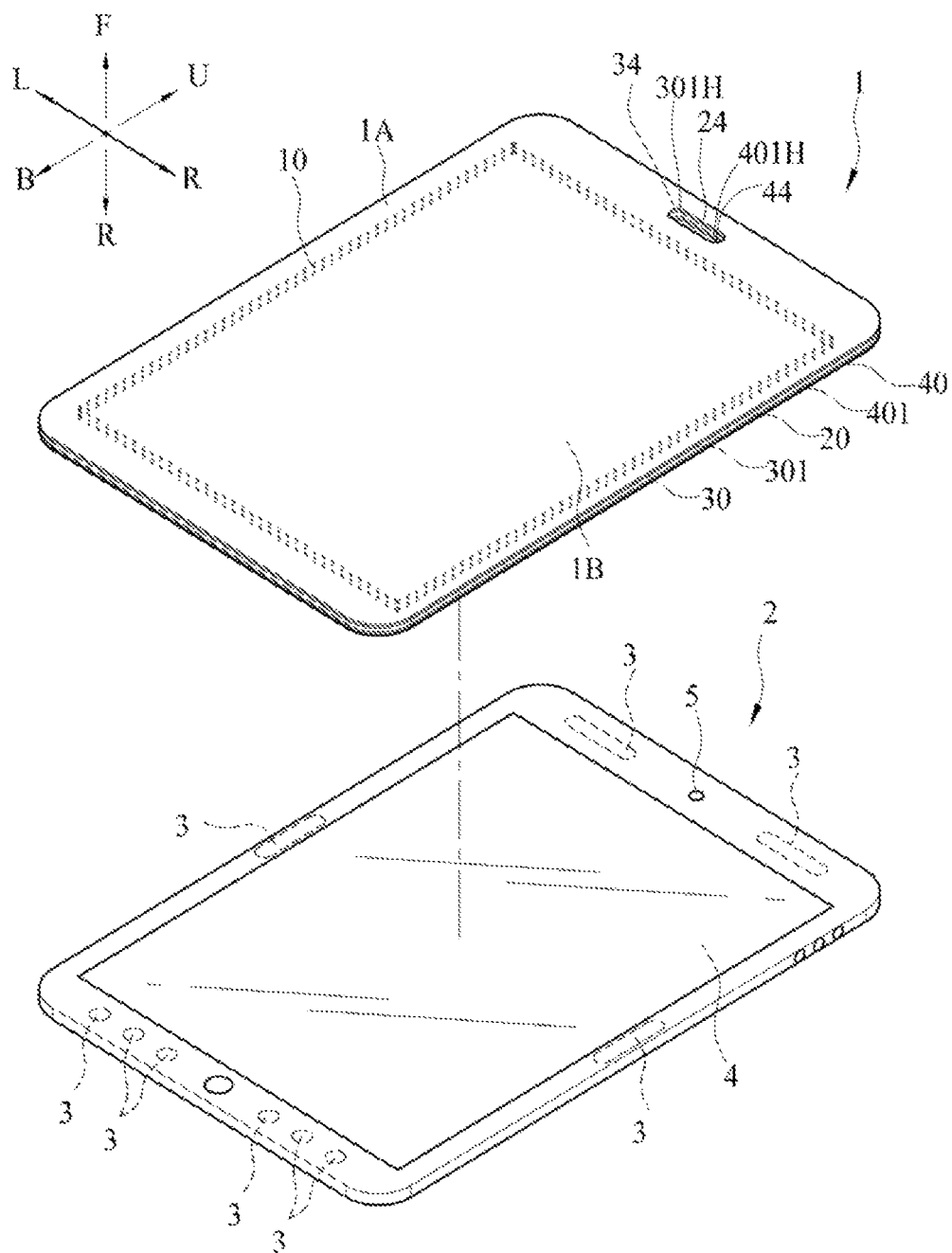
FIG. 16A is a perspective view showing another embodiment of the screen protector 1 according to the present invention.

FIG. 16A is a perspective view showing another embodiment of the screen protector 1 according to the present invention. The screen protector 1 in FIG. 16A differs from the foregoing figures in that the first attaching member 20 extends along the short side of the grating sheet 10, and the openings 34/301H/24/401H/44 are located on the screen protector 1 or the first absorbing member 20 on the short side of the grating sheet 10, and the electronic device 2 to which it is applied is a tablet computer, and the visual sensor 5 is located on the electronic device 2 and the short side of the display screen 4.

Figure 16B:
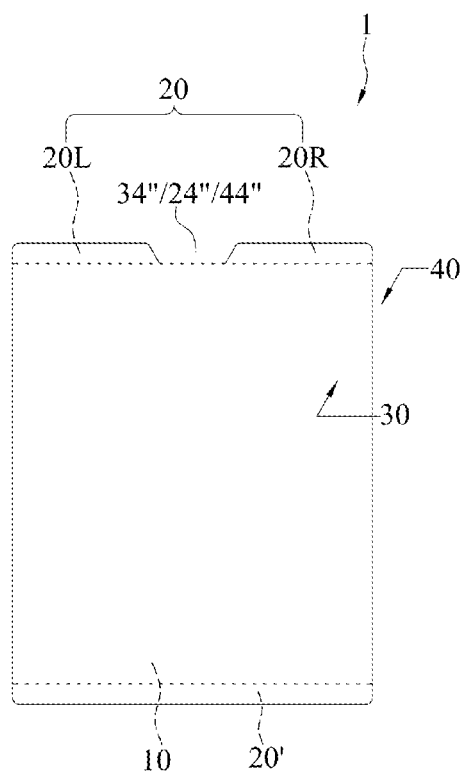
FIG. 16B is a front view showing implementation of the solution of FIG. 16A in the embodiment of FIG. 11C according to another embodiment of the screen protector 1 of the present invention.
Figure 16C:
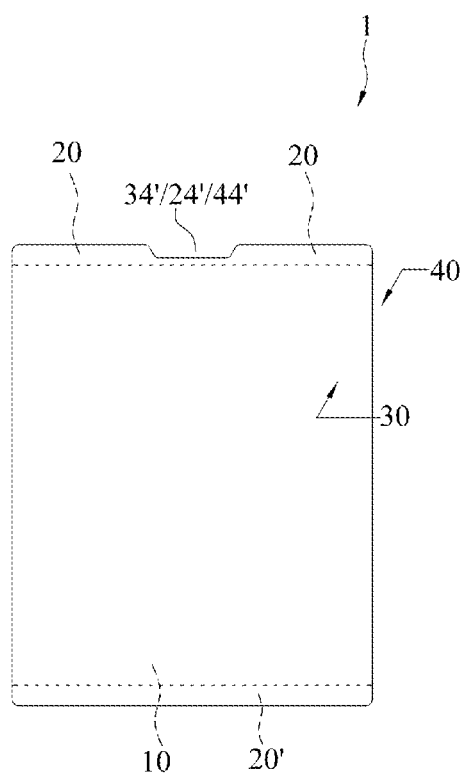
FIG. 16C is a front view showing implementation of the solution of FIG. 16A in the embodiment of FIG. 10C according to another embodiment of the screen protector 1 of the present invention.
Figure 16D:
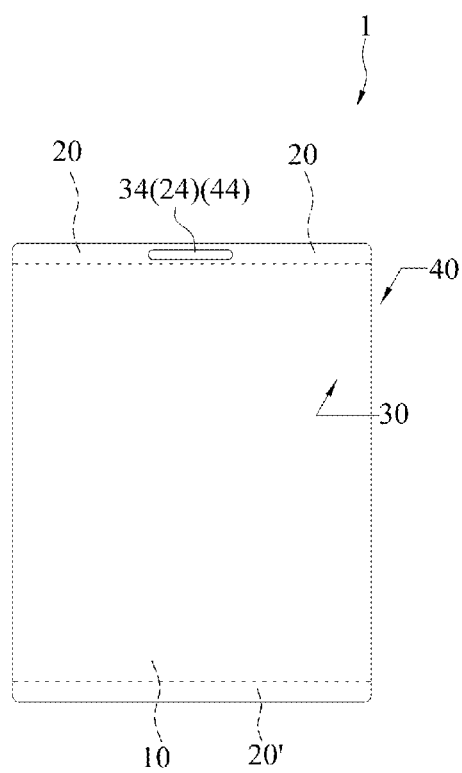
FIG. 16D is a front view showing implementation of the solution of FIG. 16A in the embodiment of FIG. 6 according to another embodiment of the screen protector 1 of the present invention.
Figure 16E:
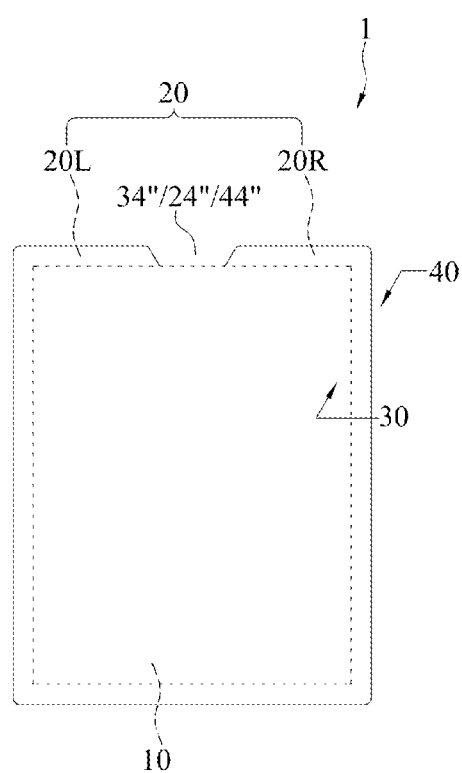
FIG. 16E is a front view showing implementation of the solution of FIG. 16A in the embodiment of FIG. 11D according to another embodiment of the screen protector 1 of the present invention.
Figure 16F:
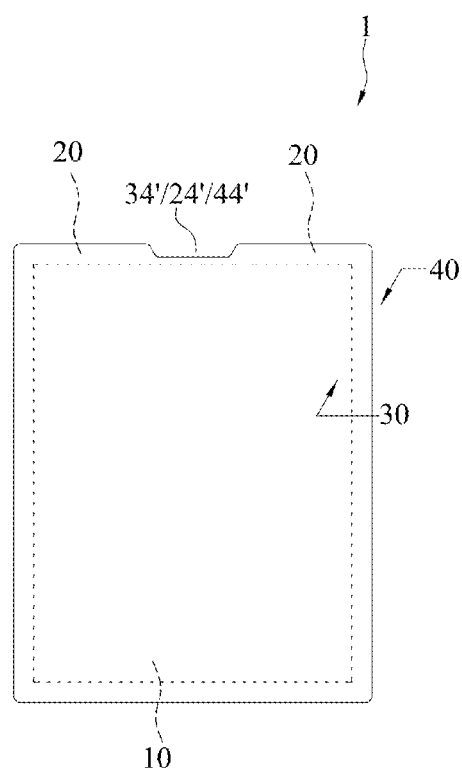
FIG. 16F is a front view showing implementation of the solution of FIG. 16A in the embodiment of FIG. 10D according to another embodiment of the screen protector 1 of the present invention.
Figure 16G:
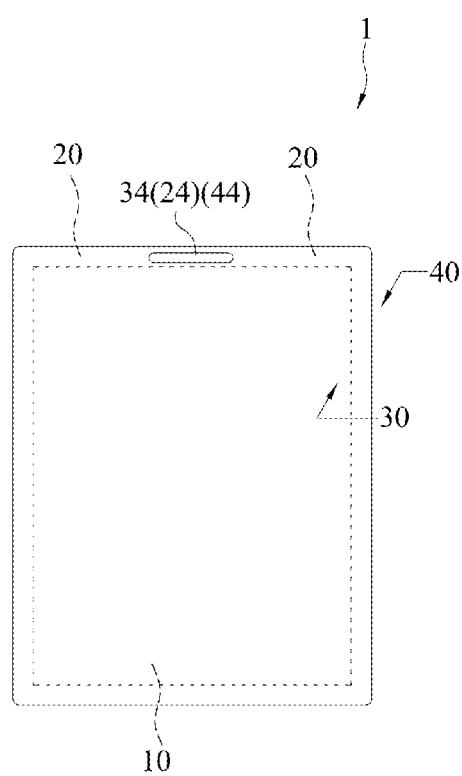
FIG. 16G is a front view showing implementation of the solution of FIG. 16A in the embodiment of FIG. 9 according to another embodiment of the screen protector 1 of the present invention.

The openings 34/301H/24/401H/44 in FIG. 16A are located on the screen protector 1 or the absorbing member 20 on the short side of the grating sheet 10, and this solution can be implemented in the screen protector 1 in FIGS. 1, 2A/2B, 3A/3B/3C, 5/6/9, 10A/10B 11A/11B, and 12A/13/14/15 instead of corresponding members, which is implemented in common with different technical solutions in the respective figures. FIG. 16B is a front view showing implementation of the solution of FIG. 16A in the embodiment of FIG. 11C. FIG. 16C is a front view showing implementation of the solution of FIG. 16A in the embodiment of FIG. 10C. FIG. 16D is a front view showing implementation of the solution of FIG. 16A to the embodiment of FIG. 6. FIG. 16E is a front view showing implementation of the solution of FIG. 16A to the embodiment of FIG. 11D. FIG. 16F is a front view showing implementation of the solution of FIG. 16A to the embodiment of FIG. 10D. FIG. 16G is a front view showing implementation of the solution of FIG. 16A to the embodiment of FIG. 9.

Next, the bending stiffness test of the screen protector is performed, and the test samples, test methods, and results are as follows:

Embodiment 1

Figure 17A:
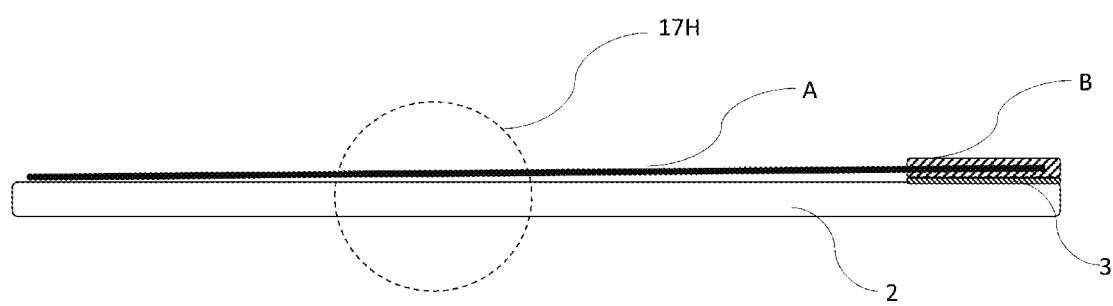
FIG. 17A is a schematic sectional view showing a conventional screen protector.
Figure 17B:
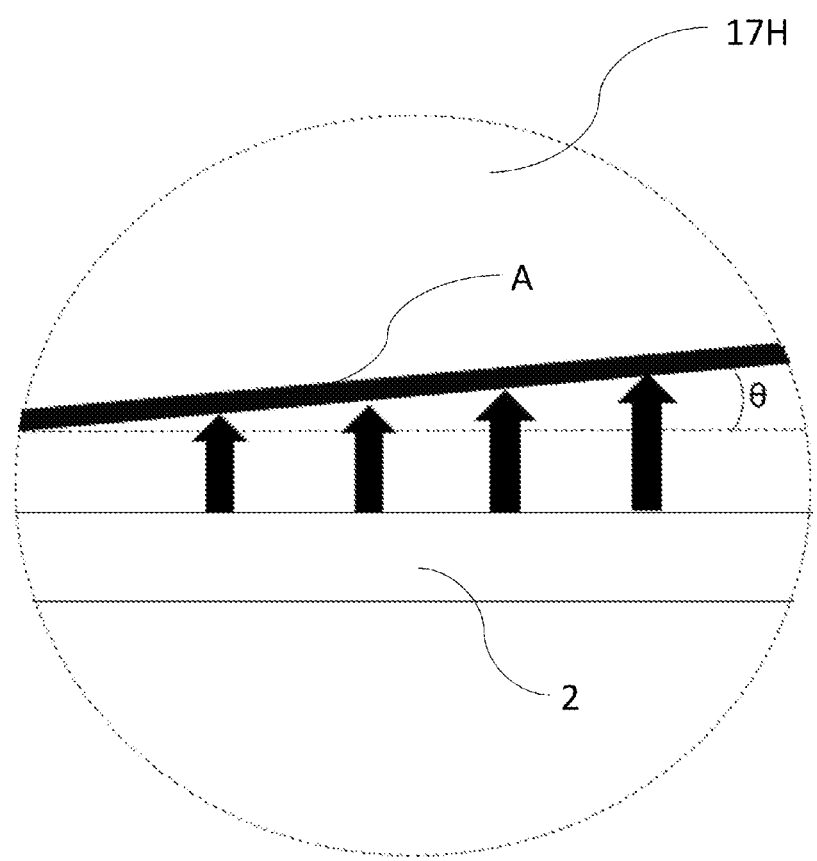
FIG. 17B is a partial enlarged view showing a region 17H in FIG. 17A.

Sample A is the screen protector of the present invention, and the structure thereof is shown in FIG. 5. Sample B is the screen protector having the structure shown in FIG. 17A/17B. Sample C is a commercially available screen protector having no attaching member. Sample A, Sample B, and Sample C all have a dimension of 29.5 cm×20 cm and a thickness of 450 μm, and are formed with openings at an intermediate position near a long side.

First, a 100 gram weight is respectively fixed on one side of Sample A, Sample B and Sample C, and is a load-bearing end near the short side; then, the load-bearing ends of Sample A, Sample B, and Sample C extend from the table top by 11 cm, so that the load-bearing end is vacated, the force applied by the weight to the load-bearing end is bent downward, and the other ends of Sample A, Sample B and Sample C are fixed on the table top with a weight of 1000 gram.

Then, the vertical distance between the load-bearing ends of Sample A, Sample B and Sample C and the table top is measured with a vernier caliper and recorded in Table 1, and then the horizontal table top is set to 0 degree, and the included angle of the load-bearing end and the horizontal table top is calculated, i.e., the sag of each sample, and the values are shown in Table 1.

Next, the sags of Sample A, Sample B, and Sample C are calculated as the bending stiffness (%) by using 0 as 100% and 90 degrees as 0%, and are recorded in Table 1.

TABLE 1

|  | Sample A | Sample B | Sample C |
|---|---|---|---|
| Vertical distance (mm) | 37.5 | 58.01 | 60.02 |
| Sag (degree) | 19 | 31 | 33 |
| Bending stiffness (%) | 79 | 65.5 | 63.4 |

It can be known from the results of Table 1 that the bending stiffness of Sample A is increased by 13.5% relative to Sample B, and is increased by about 15.6% relative to Sample C. Therefore, the screen protector of the present invention has a significantly better bending resistance than the screen protector of the prior art, and is not easily deformed by external force.

Embodiment 2

In this embodiment, the used sample and the test method are the same as those in Embodiment 1, except that during the test, the load-bearing ends of Sample A, Sample B, and Sample C extend from the table top by 14.9 cm, which is about the midline position of the long side of the sample and also the setting position of the opening. The vertical distance, the sag, and the bending stiffness (%) of the load-bearing end of each sample to the table top are shown in Table 2.

TABLE 2

|  | Sample A | Sample B | Sample C |
|---|---|---|---|
| Vertical distance (mm) | 67.5 | 98.1 | 114 |
| Sag (degree) | 24 | 37 | 41 |
| Bending stiffness (%) | 73 | 58.9 | 54.4 |

It can be known from the comparison of the results of Tables 1 and 2 that the bending stiffness of Sample A, Sample B, and Sample C is reduced compared with that of Sample A, Sample B, and Sample C in Embodiment 1, except that the extension length of the load-bearing end is longer, the midline position of the long side of the sample is also formed with an opening, which also causes the unevenness of the force to reduce the bending stiffness. Moreover, in this embodiment, the bending stiffness of Sample A is increased by 14.1% relative to Sample B, and is increased by 18.6% relative to Sample C, and the increase amplitudes thereof are superior to the results shown in Embodiment 1, it is indicated that even at the position where the opening is formed, the screen protector of the present invention still has a significantly better bending resistance than the screen protector of the prior art, and is not easily deformed by the external force.

In summary, the screen protector of the embodiments of the present invention reverses the design direction of the externally added components that have not been solved for decades, and the attaching member is disposed adjacent to the grating sheet side-by-side, and is coated with, at the front and back, the two outer cover films. The functional components and decorative components are successfully integrated into the same layer as the grating sheet, and the screen protector is further thinned while maintaining its original fast adsorption removal function and decorative requirements. Moreover, the screen protector of the embodiments of the present invention can provide sufficient structural strength through two outer cover films and the UV-curing attachment of the first adhesive layer and the second adhesive layer, so that two independent planar components, i.e., the grating sheet and the absorbing member are not inclined or bent at the junction.

The description of the disclosed embodiments is provided to enable a person skilled in the art to make or use the present invention. Various modifications to these embodiments are obvious to a person skilled in the art, and the general principles defined herein can be implemented in other embodiments without departing from the spirit or scope of the present invention. Therefore, the present invention is not limited to the embodiments shown herein, but is intended to conform to the broadest scope of the principles and novel features disclosed herein.

DESCRIPTION OF REFERENCE NUMERALS

1 Screen protector
1A Adsorption zone
1B Viewing zone
10 10" 10''' 10'''' Grating sheet
11 11" 11''' 11'''' Top edge (of the grating sheet)
12 12" 12''' 12'''' Bottom edge (of the grating sheet)
13A, 13B Side edge (of the grating sheet)
14 receiving groove
14' through hole
15 the first receiving groove
16 the second receiving groove
20 First attaching element
21 Top edge (of the first attaching element)
22 Bottom edge (of the first attaching element)
23A, 23B Side edge (of the first attaching element)
24, 24', 24" Opening (of the first attaching element)
30 First outer cover film
31 Top edge (of the first outer cover film)
32 Bottom edge (of the first outer cover film)
33A, 33B Side edge (of the first outer cover film)
34, 34', 34" Opening (of the first outer cover film)
40 Second outer cover film
41 Top edge (of the second outer cover film)
42 Bottom edge (of the second outer cover film)
43A, 43B Side edge (of the second outer cover film)
44, 44', 44" Opening (of the second outer cover film)
2 Electronic device
3, 3T, 3T' Attaching body
4 Display screen
5 Visual sensor
101, 103 Outer layer (of the grating sheet)
102 Grating layer
1021 Grating wall
301 First adhesive layer
301H Opening (of the first adhesive layer)
401 Second adhesive layer
401H Opening (of the second adhesive layer)
10' Grating sheet
11' Top edge (of the grating sheet)
12' Bottom edge (of the grating sheet)
13A', 13B' Side edge (of the grating sheet)
20' Second attaching element
21' Top edge (of the second attaching element)
22' Bottom edge (of the second attaching element)
23A', 23B' Side edge (of the second attaching element)
25 Main opening (of the first attaching element)
251, 252, 253, 254 Inner periphery (of the main opening of the first attaching element)
341, 342, 343 Inner edge (of the opening 34')
241, 242, 243 Inner edge (of the opening 24')
441, 442, 443 Inner edge (of the opening 44')
24" Gap
20L, 20R Half-attaching element
247 Side edge (of the half-attaching element 20L)
249 Side edge (of the half-attaching element 20R)
347, 348, 349 Inner edge (of the opening 34")
447, 448, 449 Inner edge (of the opening 44")
118 Middle top edge (of the grating sheet 10)
11L Left top edge (of the grating sheet 10)
11R Right top edge (of the grating sheet 10)
22L Bottom edge (of the half-attaching element 20L)
22R Bottom edge (of the half-attaching element 20R)
21L Top edge (of the half-attaching element 20L)
21R Top edge (of the half-attaching element 20R)
31L Left top edge (of the first outer cover film 30)
31R Right top edge (of the first outer cover film 30)
41L Left top edge (of the second outer cover film 40)
41R Right top edge (of the second outer cover film 40)
25 Main opening
14, 14' Truncated side
50, 50' Third attaching element
51 Inner side (of the third attaching element 50)
52 Bottom side (of the third attaching element 50)
53 Vertical side (of the third attaching element 50)
51' Inner side (of the third attaching element 50')
52' Bottom side (of the third attaching element 50')
53' Vertical side (of the third attaching element 50')
141, 142 A pair of truncated sides (of the grating sheet 10)
141', 142' A pair of truncated sides (of the grating sheet 10)
511, 512 A pair of inner sides (of the third attaching element 50)
511', 512' A pair of inner sides (of the third attaching element 50')
60 Tab
35 Lug (formed by extending the first outer cover film 30)
45 Lug (formed by extending the second outer cover film 40)
601 Sealant
15 Lug (formed by extending the grating sheet 10)
71, 72 Decorative layer
711 Bottom edge (of the decorative layer)
111 Front top edge (of the grating sheet 10)
110 Main top edge (of the grating sheet 10)
112 Rear top edge (of the grating sheet 10)
720 Outer periphery (of the decorative layer 72)
721 Bottom edge (of the decorative layer 72)

What is claimed is:

1. A manufacturing method of a screen protector, wherein the screen protector is a laminated structure having a flat outer surface without an interval and at least comprising a first outer cover film, a functional layer composed of a grating sheet and an attaching member, and a second outer cover film and is configured to be disposed on an attaching body on an electronic device in an attaching mode to correspondingly cover a display screen of the electronic device, and the manufacturing method comprises the following steps:

a sheet punching step: sheets constituting the first outer cover film, the second outer cover film, the grating sheet, and the attaching member are cut into specific sizes, respectively;

a functional layer forming step: the grating sheet and the attaching member are disposed and attached to a front surface of the second outer cover film to form the functional layer, and the attaching member is joined to the grating sheet in such a manner that a surface of the attaching member is aligned with a surface of the grating sheet;

a half-finished product forming step: a rear surface of the first outer cover film is bonded to the grating sheet and the attaching member to form a half-finished product; and a heating and pressing defoaming step: vacuum-pressing is performed on the half-finished product under appropriate conditions, to remove bubbles inside the half-finished product, and the surface of the half-finished product is flattened to obtain the screen protector, wherein the grating sheet has a visual range within a specific angle.

2. The manufacturing method of a screen protector according to claim 1, wherein prior to the functional layer forming step, the method further comprises an adhesive layer applying step: a viscous adhesive material is respectively applied to the rear surface of the first outer cover film and the front surface of the second outer cover film respectively, to form a first adhesive layer and a second adhesive layer.

3. The manufacturing method of a screen protector according to claim 2, wherein in the functional layer forming step, the grating sheet and the attaching member are attached to the front surface of the second outer cover film through the second adhesive layer; and in the half-finished product forming step, the grating sheet and the attaching member are attached to the rear surface of the first outer cover film through the first adhesive layer.

4. The manufacturing method of a screen protector according to claim 1, wherein the grating sheet comprises an outer layer and a grating layer, and the grating layer comprises a plurality of grating walls.

5. The manufacturing method of a screen protector according to claim 1, wherein the surface of the first outer cover film and/or the second outer cover film is coated with at least one coating, and the coating is selected from any one of an anti-fingerprint coating (having an ultra-low friction coefficient), an anti-glare coating, an anti-reflection coating, an anti-blue light coating, a hard coating, and combinations thereof.

6. The manufacturing method of a screen protector according to claim 1, wherein there is one or a plurality of attaching members.

7. The manufacturing method of a screen protector according to claim 1, wherein the attaching member is disposed adjacent to the grating sheet side-by-side.

8. The manufacturing method of a screen protector according to claim 1, wherein the grating sheet comprises a first receiving groove near an edge of the grating sheet, and the attaching member is received in and fitted to the first receiving groove.

9. The manufacturing method of a screen protector according to claim 8, wherein the grating sheet further comprises a second receiving groove near the edge of the grating sheet, and the attaching member comprises two half-attaching members, which are received in and fitted to the first receiving groove and the second receiving groove respectively.

* * * * *